(12) United States Patent
Spadafora et al.

(10) Patent No.: US 6,374,997 B1
(45) Date of Patent: Apr. 23, 2002

(54) CONVEYOR SYSTEM

(75) Inventors: Tony Spadafora, Ancaster; Tomasz Kardynal, Mississauga, both of (CA)

(73) Assignee: Langen Packaging Inc., Ontario (CA)

( * ) Notice: Subject to any disclaimer, the term of this patent is extended or adjusted under 35 U.S.C. 154(b) by 0 days.

(21) Appl. No.: 09/533,861

(22) Filed: Mar. 24, 2000

(51) Int. Cl.$^7$ .............................................. B65G 17/00
(52) U.S. Cl. ................................ 198/803.11; 198/803.9; 198/473.1; 53/257; 53/387.1; 493/475
(58) Field of Search ........................ 198/803.11, 803.9, 198/473.1, 482.1; 53/387.1, 387.2, 257, 260, 566; 493/475, 476, 474

(56) References Cited

U.S. PATENT DOCUMENTS

| | | | | |
|---|---|---|---|---|
| 2,358,292 A | * | 9/1944 | Malhiot | 198/131 |
| 3,608,701 A | * | 9/1971 | Dieter | 198/189 |
| 4,718,540 A | | 1/1988 | Greenwell | 198/627 |
| 4,823,934 A | * | 4/1989 | Lamaire et al. | 198/470.1 |
| 4,874,067 A | | 10/1989 | Greenwell | 192/4 |
| 5,072,573 A | | 12/1991 | Tisma | 53/252 |
| 5,188,217 A | * | 2/1993 | Bruno | 198/803.9 |
| 5,392,896 A | | 2/1995 | Martelli | 198/473.1 |
| 5,735,378 A | | 4/1998 | Sundquist | 193/356 |
| 5,755,317 A | | 5/1998 | Holston | 198/484.1 |
| 5,868,239 A | * | 2/1999 | Bonnet | 198/370.02 |

FOREIGN PATENT DOCUMENTS

| | | | | |
|---|---|---|---|---|
| JP | 03180587 | 1/1993 | | B65G/61/00 |
| JP | 04263010 | 4/1994 | | B65B/5/02 |
| JP | 08087452 | 9/1997 | | B65B/43/30 |

* cited by examiner

Primary Examiner—Christopher P. Ellis
Assistant Examiner—Khoi H. Tran
(74) Attorney, Agent, or Firm—Antonelli, Terry, Stout & Kraus, LLP

(57) ABSTRACT

A conveyor system has a bucket with a pivoting side wall. The pivoting movement of the leading side wall is actuated by a cam follower which engage; a cam rail. As the bucket passes through a carton loading station, the cam rail moves the cam follower to adjust the rotational position of the side wall. This pivoting movement will push back the leading side flap of a carton, thus making the loading of the carton easier. For different sized cartons, the transverse position of the cam rail can be adjusted thus altering the relevant rotational movement of the pivoting side wall.

36 Claims, 18 Drawing Sheets

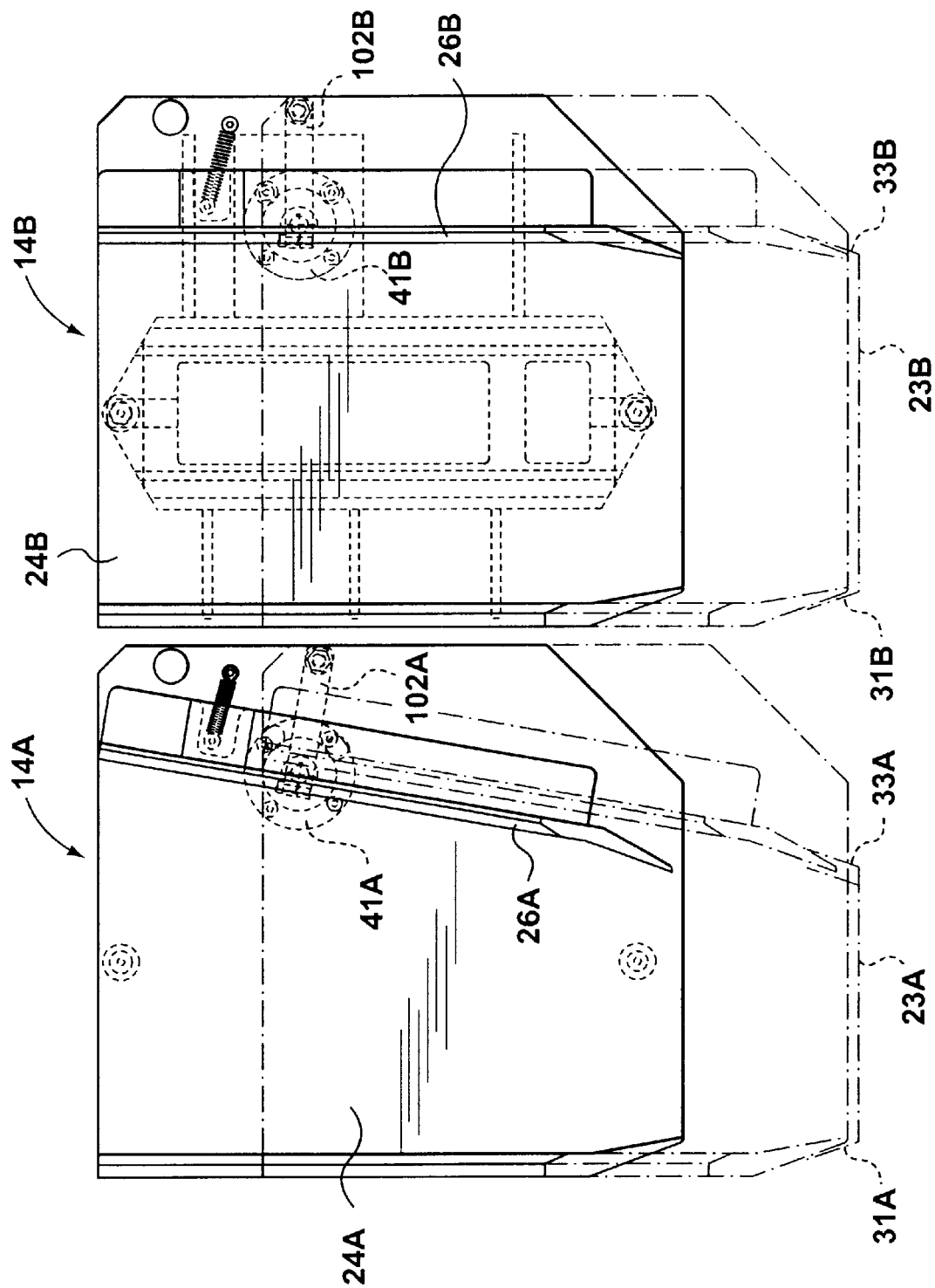

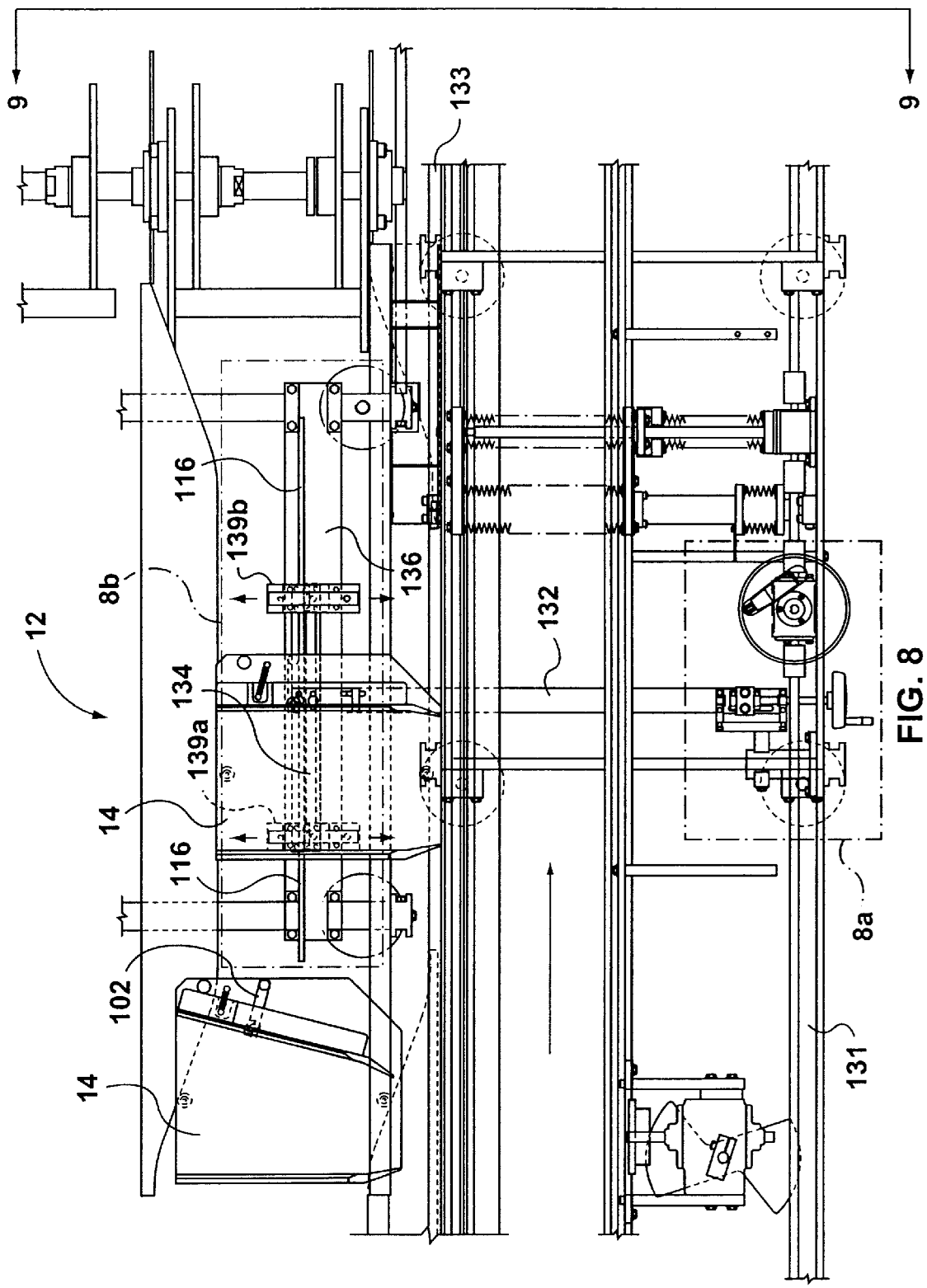

CONVEYOR SYSTEM

FIELD OF THE INVENTION

This invention relates to conveyor systems and to article holders employed in such conveyor systems.

BACKGROUND OF THE INVENTION

Many conveyor systems, particularly those used in the packaging industry, have holders such as buckets, for holding one or more articles. The buckets are typically secured to a conveyor drive and carrying mechanism and the conveyor mechanism moves the buckets along a path, usually a closed path. In many conveyor systems, the path each bucket takes includes movement from a bucket loading station (where each buckets are loaded with one or more articles of some kind) to a bucket unloading station where the article in each bucket is discharged. In some conveyor systems, the bucket is in continuous movement throughout their path. In other systems, the movement is intermittent, along at least part of its path, such as at a loading or unloading station.

At die bucket loading station, sometimes more than one bucket can be loaded at the same time. Each of the loaded buckets is moved from the loading station to an unloading station at which the articles are unloaded from the bucket into something else, such as for example, another bucket carried by another conveyor, or quite commonly, into a receptacle such as a carton which is held in a carton holder. In the latter case, the carton holder itself is usually part of a carton holder conveyor system. The carton holder conveyor system comprises a series of carton holders mounted to a conveyor drive and carrying mechanism. The carton holders are moved into and out of a carton loading station by the conveyor mechanism. At the carton loading station, each article is unloaded from a bucket and into the carton held in the carton holder. The unloading of an item from a bucker into a carton is usually done while both the buckets and carton holders are continuously moving. However, since during the bucket unloading/carton loading process both the bucket conveyor and the carton conveyor are moving at the same speed and in the same direction, each bucket does not move relative to a corresponding, longitudinally aligned carton holder, thus making the transfer of an item from a bucket to a carton possible, "on the fly".

Design considerations in building such systems, particularly high speed packaging systems, include: (1) each bucket being appropriately sized to accommodate the article to be carried; (2) each bucket's outlet being appropriately sized to ensure that when the article carried therein is discharged, it will feed easily into the carton.

To ensure that an article can be easily discharged from a bucket and into the carton, the bucket outlet and the carton opening are usually brought into close proximity with each other. The bucket outlet, and the carton opening are usually of substantially the same size across, although the bucket outlet might be slightly smaller in width than the width of the carton opening. This helps to reduce the chance of an article not being properly discharged from the bucket into the carton, Each carton will usually have one or two pairs of flaps which help in sealing the carton, These flaps have a tendency to protrude out in front of the carton's opening. To ensure that the bucket can be brought into close proximity with the carton opening, and that the flaps, particularly the side flaps, do not obstruct the opening, the flaps must be pushed back away from the carton opening. This is conventionally done for the side flaps by means of a vertical flap kicker device, which is mounted at the carton loading/bucket unloading station, and operates to push the side flaps of each carton back away from the opening. However, this flap kicker is an additional piece of machinery, which of course by its nature, may from time to time breakdown or function improperly.

Not infrequently, it is necessary for a conveyor packaging system to be reconfigured such as when different sized or shaped articles, or perhaps sometimes even the same size and shaped articles, must be fed into different sized cartons. In known systems, this will not only require adjustment to the carton holder, but will also typically require adjustment be made to, or substitution of, each bucket on the bucket conveyor system.

An example of an adjustable conveyor bucket is illustrated in U.S. Pat. No. 5,127,514 issued in the name of Guttinger et al. It will be appreciated that having to make an adjustment to each individual bucket as depicted in this patent, to adjust the width of its side openings, is labour intensive, time consuming and significantly adds to the downtime for the system during a changeover.

Accordingly, it is desirable to provide a system that eliminates the need for a vertical flap kicker device for the side flaps. It also desirable to provide a system which reduces the effort involved with changeovers that are usually necessary in conventional systems, such as, for example, modifications to the system to accommodate different sized cartons.

SUMMARY OF THE INVENTION

According to one aspect of the invention, there is provided an article holder for a conveyor, said article holder comprising: a base member having an outlet side; a moving member mounted proximate said outlet side of said base member for movement relative to said base member, said moving member being movable between a first position and a second position; said moving member being operatively interconnected to an actuating apparatus such that in operation, when said holder is at a station, said actuating apparatus is activated to cause movement of said moving member between said first position and said second position relative to said base member.

According to another aspect of the invention, there is provided an article holder comprising: a base remember; a first side member upstanding from said base member; a second side member upstanding from said base member and spaced from said first side member; said first and second side members being generally disposed opposite each other to define an outlet; said second side member being mounted for pivoting movement relative to said first side member, said second side member movable between a first position and a second position wherein in said first position the spacing between said first and second side members is narrowed at said outlet relative to said when said second side member is in said second position; a rotator adapted to rotate said second wall member between said first and second positions.

According to another aspect of the invention, there is provided an article holder conveyor system having a station, said system comprising; a conveyor having a conveyor path; a plurality of article holders mounted to said conveyor in series, each article holder adapted to be moved along said conveyor path by said conveyor, each sad article holder comprising; a base member having an outlet side; a flap pushing member mounted proximate said outlet side of said base member for movement relative to said base member, said flap pushing member being movable between a first position and a second position; said flap pushing member being interconnected to a first actuating apparatus such that in operation, movement of said actuating apparatus moves said flap pushing member between said first position and said second position relative to said base member; a second actuating apparatus disposed proximate said conveyor, said second actuating apparatus co-operating with said first actuating apparatus of each article holder of said plurality of article holders in operation, such that as each article holder moves through said station, said flap pushing member of each article holder is moved between said first position and said second position by the interaction of said first actuating apparatus and said second actuating apparatus; said system operable to move each of said outlet sides of each said article holder into close proximity with a receptacle at said station, each receptacle having a pair of opposed side flaps located on either side of a receptacle opening, and said system operable to move said first actuating apparatus and said second apparatus relative to each other to cause said first actuating apparatus to interact with said second actuating apparatus to move said flap pushing member between said first position and second position to push a side flap away from said opening.

According to another aspect of the invention, there is provided a method of unloading an item from an item holder into a receptacle, said receptacle having at least one side flap located at a side of a receptacle opening, said item holder comprising: a base member having an outlet side; a flap pushing member mounted proximate said outlet side of said base member for movement relative to said base member, said flap pushing member being movable between a first position and a second position; said flap pushing member being operatively interconnected to an actuating apparatus such that in operation, movement of said actuating apparatus moves said flap pushing member between said first position and said second position relative to said base member; said method including the step of moving the outlet side of said item holder relative to a receptacle such that said outlet side is in close proximity with said receptacle, said movement of said item holder causing said actuating apparatus to move said flap pushing member between said first position and second position to push said at least one side flap away from said receptacle opening.

According to another aspect of the invention, there is provided an article holder conveyor system having a station, said system comprising: a conveyor having a conveyor path; a plurality of article holders mounted to said conveyor in series, each article holder adapted to be moved along said conveyor path by said conveyor, each said article holder comprising; a base member having an outlet side; a first wall member mounted to said base a second wall member mounted opposite and spaced apart from said first base member and proximate said outlet side of said base member for movement relative to said base member, said first wall member and said second wall member defining therebetween an outlet, said second wall member being movable between a first position and a second position; said second wall member being interconnected to a first actuating apparatus associated with each article holder such that in operation, movement of said first actuating apparatus moves said second wall member between said first position and said second position relative to said base member; a second actuating apparatus positioned proximate said conveyor said second actuating apparatus co-operating with said first actuating apparatus of each article holder of said plurality of article holders, such that in operation as each article holder moves through said station, said second wall member of each article holder is moved between said first position and said second position by the interaction of each said first actuating apparatus of each article holder and said second actuating apparatus; said system operable to move each of said outlet sides of each said article holder into close proximity with a carton at said station, and said system operable to move said first actuating apparatus and said second apparatus relative to each other to cause said first actuating apparatus to interact with said second actuating apparatus to move said second wall member between said first position and second position to vary the size of said outlet between said first and second wall members.

BRIEF DESCRIPTION OF THE DRAWINGS

The following is a description, by way of example embodiments of the present invention, reference being made to the accompanying drawings in which:

FIG. 7 is a top plan view at 7—7 in FIG. 5 but with one of the buckets shown in a different configuration than shown in FIG. 5;

FIG. 8 is a top plan view of part of a bucket unloading station in the bucket conveyor system;

DETAILED DESCRIPTION OF THE PREFERRED EMBODIMENTS

In overview, the preferred embodiment includes a bucket conveyor system 10, which employs a conveyor 16 having a series of buckets 14. In the preferred embodiment, the conveyor 16 moves buckets 14 continuously along their path. In alternative embodiments, the movement along at least part of its path may be intermittent. The buckets 14 each have a rotatable side wall 26 which is mounted for pivoting rotation relative to the bucket base. The side wall 26 is interconnected to an actuating assembly (in the preferred embodiment a cam follower or roller) and to a biasing spring. The spring will bias the side wall in one direction, tending to turn the outlet end of the side wall inward, thus maintaining a relatively narrow size of outlet opening. However, as each bucket moves along the conveyor track, at certain places along the path of the buckets, each bucket's roller engages a cam rail positioned below the conveyor. The result is that a force is applied to the cam follower, which causes the side wall to rotate relative to the base member thus widening the size of the outlet opening. This movement of the side wall can be utilized as the bucket is brought into close proximity with a side flap of a carton. If the carton's side flap is obstructing the carton opening to any extent, it is pushed away from the opening by the movement of the side wall. When the bucket side wall has been rotated to widen the size of the outlet, an item in the bucket can be discharged from the bucket by conventional means. A second cam rail may also be provided for the movement of the bucket, while the bucket is being unloaded. This second rail is positioned on the opposite side of the roller to the first cam rail. Thus, the roller is held between two opposed cam rails in a steady transverse position relative to the bucket during unloading. The second cam rail will ensure that during the unloading operation, the rotatable side wall is not forced in an outward direction by the product as the product is pushed out of the bucket into the waiting carton. Rather, during unloading of the bucket, the rotational position of the side wall is substantially fixed.

The position of the cam rail(s) can be adjusted, thereby for each bucket, altering the movement of the roller relative to the bucket's base, and thus the movement of the side wall relative to the bucket's base. Thus, in a singe adjustment of the cam rail(s), the overall rotational movement of each bucket can be varied along the conveyor path.

Figure 3:
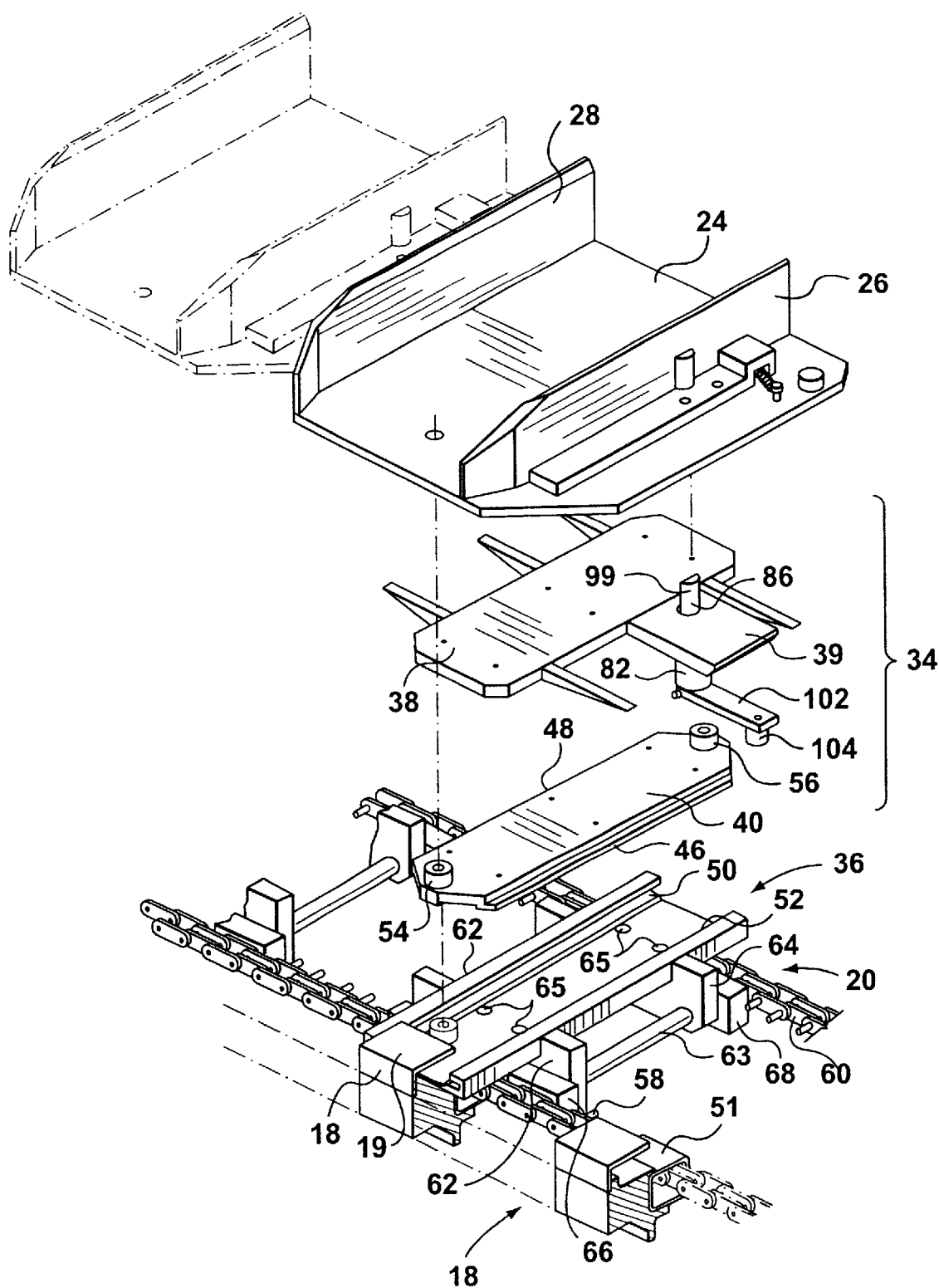
FIG. 3 is an upper perspective exploded view of a part of the bucket conveyor system of FIG. 1.
Figure 4:
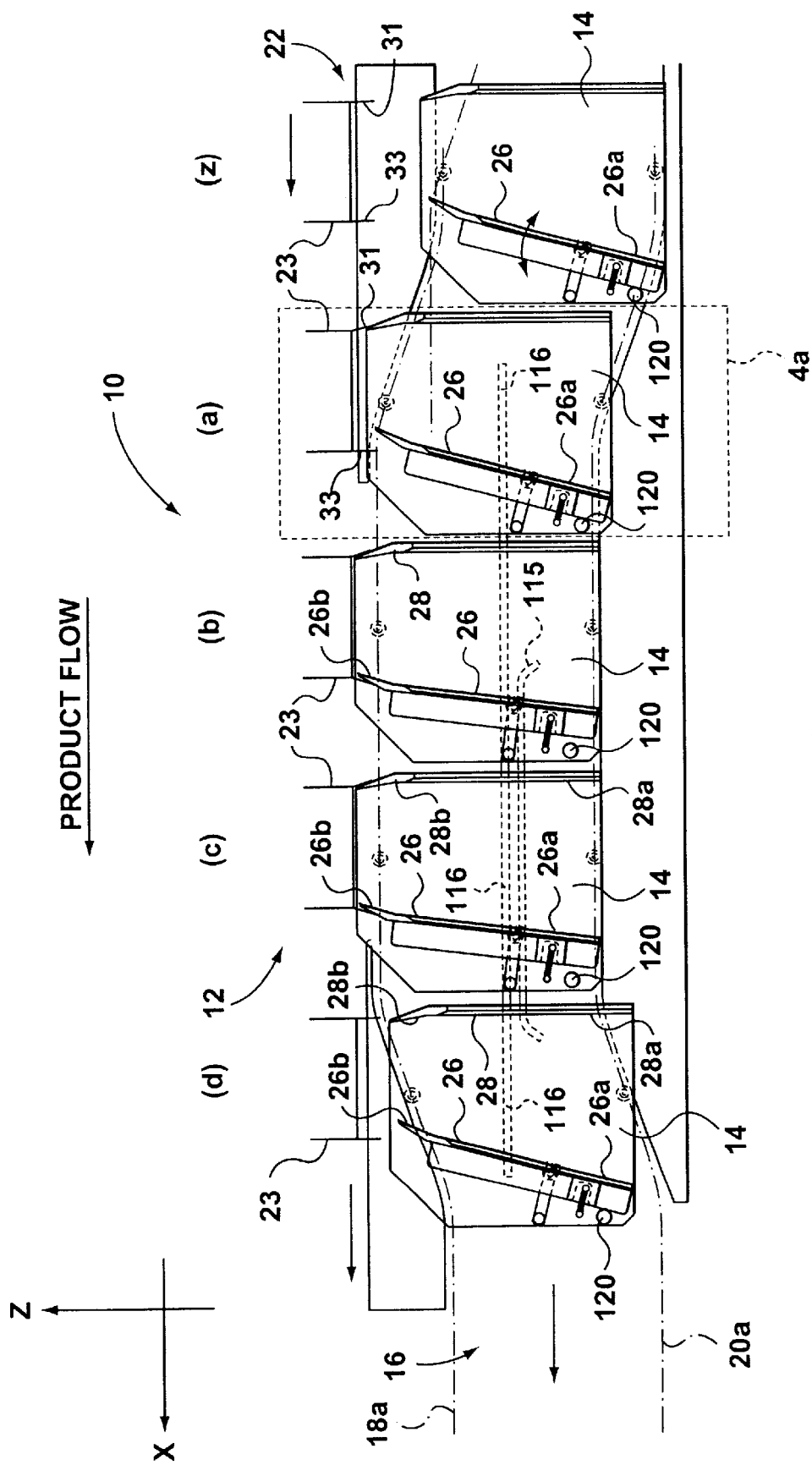
FIG. 4 is a top schematic plan view of a part of the system of FIG. 1.

The details of the preferred embodiment are now hereinafter described. With reference to FIG. 4, a carton loading/bucket unloading station 12, which is part of a bucket conveyor system 10, is schematically shown. As shown in FIG. 4, a series of article or item holders, in this case buckets 14, are mounted in series to a conveyor 16. The conveyor 16 has a pair of parallel spaced apart bucket locator rails 18 and 20 (the latter's corresponding position only generally identified in FIG. 3, but being the mirror image of conveyor track 18)

Figure 1:
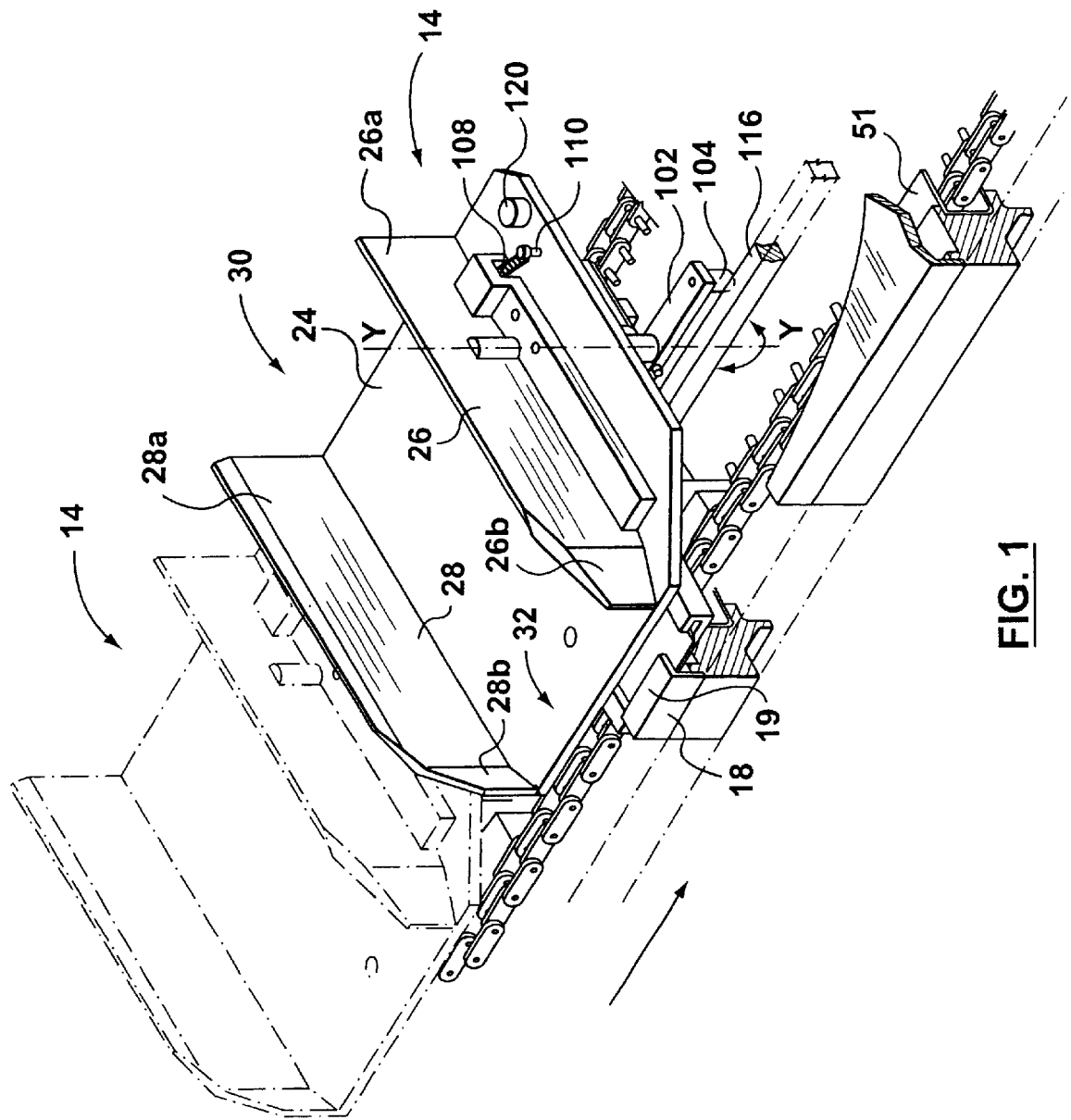
FIG. 1 is a top perspective of part of a bucket conveyor system in accordance with a first embodiment of the invention.
Figure 2:
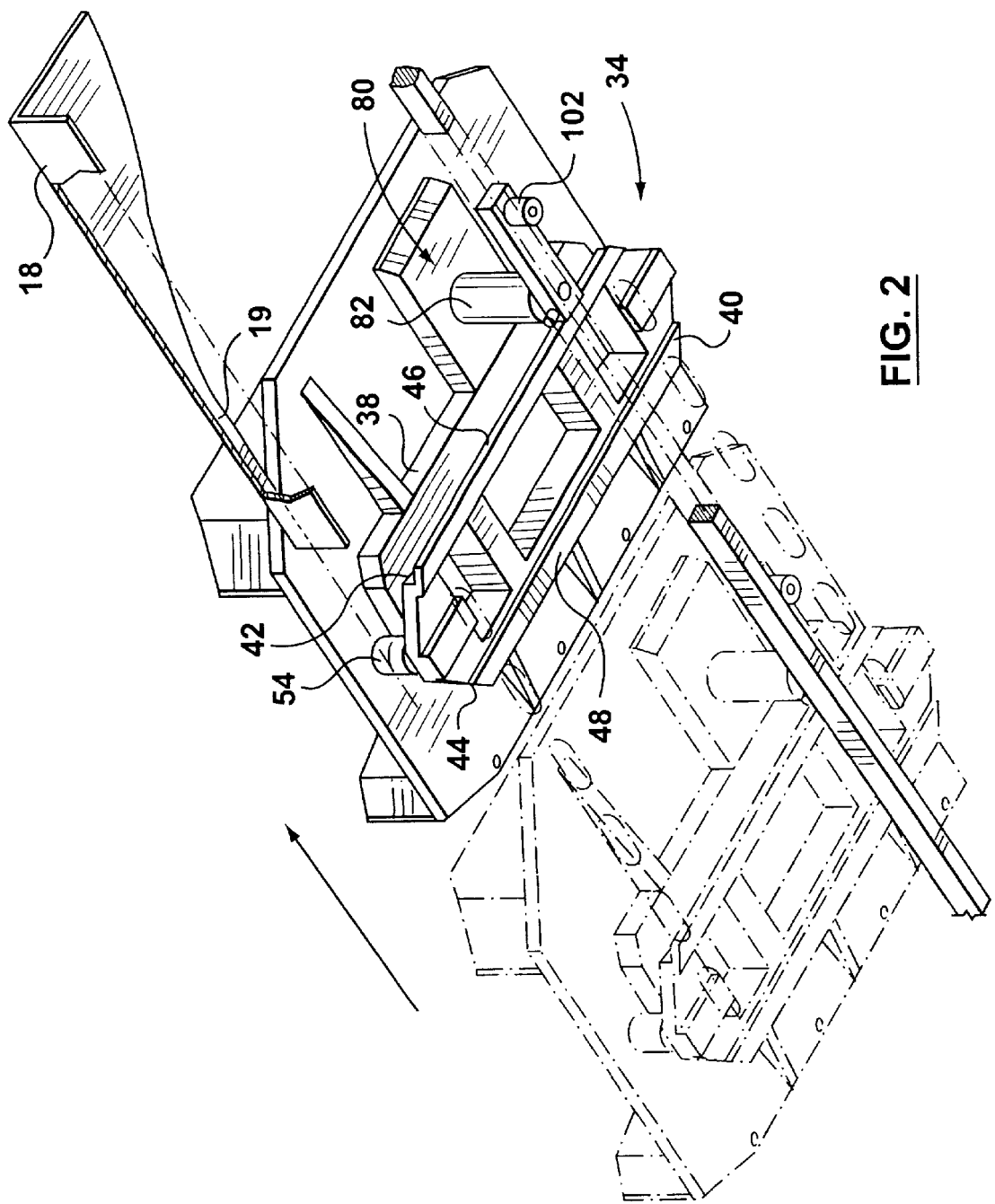
FIG. 2 is a bottom perspective view of the part of FIG. 1.

Each conveyor track 18 and 20 have an inwardly extending top plate. Only top plate 19 of rail 18 is shown in the drawings, but opposite rail 20 also has an inwardly directed plate (FIGS. 1, 2 and 3). The plates can be integrally formed as part of the rail. The buckets have rollers 54,56 which abut the plates of locator rails 18,20 respectively. The rails help guide the movement of each bucket on its path, including its path through the carton loading station.

Lines 18a and 20a in FIG. 4 illustrate the path of the center of the rollers 54,56 respectively of each bucket. The buckets move on a path from right to left in FIG. 4 through the carton loading station 12 as shown by the arrows for product flow and the arrow proximate the conveyor. A separate carton holder conveyor shown schematically as 22 also moves a series of pairs of carton holders (not shown in FIG. 4—see carton holders 24,25 in FIG. 9) from right to left and each pair of carton holders caries a carton 23.

At carton loading station 12, each bucket 14 in turn is brought into a position closely adjacent to a carton 23, as will hereinafter be described in much further detail. This movement of each bucket 14 in turn, in a transverse direction toward the carton 23 is created by a camming action of one of the plate of locator rail 20 on its respective adjacent roller 56, thus forcing each bucket in turn first toward the carton conveyor. Note that as the bucket conveyor is moving generally in the same longitudinal direction and speed along carton holder conveyor 22, this enables one or more articles (not shown) carried in each bucket to be discharged into an open carton that is in a closely adjacent longitudinal position. Once the carton is loaded with the articles discharged from the bucket, the carton is carried away by its carton holder 24,25 on carton conveyor 22. The corresponding bucket 14, is also carried away from station 12 by conveyor 16 during which it is cammed in the opposite direction by locator rail 18 acting on roller 54.

In this packaging system, the design of the carton conveyor, the carton holder 24,25 and its movements to, at, and from, station 12 are conventional. The carton holders move continuously thorough the carton loading station, in synchronized longitudinal movement relative to the buckets carried on the bucket conveyor 16.

In FIGS. 1, 2 and 3, a pair of buckets 14 are shown. One bucket 14 is shown in shadow form to indicate that both buckets 14 are part of a number of such buckets, arranged in series on conveyor 16. Parts of conveyor 16 are shown including parts of locator rail 18 and the general corresponding position of an opposed locator rail 20. A pair of oppositely disposed conveyor drive chains 58, 60 are disposed opposite to each other and positioned between and slightly below conveyor bucket locator rails 18 and 20 respectively. Drive chains 58, 60 each are formed in a continuous loop and are driven by a conventional means such as rotating toothed wheels driven by a motor. Drive chains 58, 60 are held within a C-shaped conveyor track (only track 51 is shown in FIGS. 1 and 3).

Bucket 14 has a base member 24. Mounted to the base member 24 in vertically upstanding relationship, are a leading wall member 26 and a trailing wall member 28. Leading wall 26 and trailing wall 28 are spaced apart from each other and provide a bucket first side opening 30 and an opposed bucket side opening 32. Opening 32 provides an outlet for bucket 14 to permit an item to be discharged from the bucket therethrough. The bucket side outlet opening 32 is formed between respective side outlet opening portions 26b and 28b of leading and trailing wall members 26, 28, respectively. Both side outlet opening portions 26b and 28b are angled inwardly relative to the rest of wall members 26 and 28 respectively. One or more articles or items (not shown) can be swept onto base member 24 through first side opening 30 by a conventional side sweeper loader. Alternatively, the loading of the bucket might take place by use of a conventional overhead loader (not shown) which drops one or more items into each bucket at a bucket loading station. The items are then retained between walls 26 and 28, and then at the carton loading station discharged though the side outlet opening 32 by a conventional discharge mechanism, such as a transverse pushing mechanism.

Bucket 14 may be mounted to conveyor 16 in any conventional manner, for example such as is hereinafter described, or in a manner similar to that disclosed in U.S. Pat. No. 5,125,514, the contents of which are hereby incorporated by reference.

In the embodiment disclosed in FIGS. 1–3 and 5–7, the buckets are mounted to conveyor 16 as follows. Formed as part of, or secured to, the under side of base member 24 are conveyor attachment components generally designated 34 which can be secured to bucket mount member 36, which is itself attached to conveyor 16. A medial plate 38 is sandwiched between a lower plate 40 and the underside of base member 24 creating a pair of oppositely disposed channels 42 and 44 oriented transversely to the direction of movement and conveyor direction and also forming opposite the disposed transverse ribs 46 and 48. One or both of medial plates 38 and lower plate 40 could be integrally formed with the base member 24.

The transverse ribs 46 and 48 can be moved in sliding engagement with appropriately sized and shaped channels 50 and 52 in conveyor mounting plate 36. Thus, mounting plate 36 provides a sliding bucket guide for mounting the bucket to the conveyor. Accordingly, bucket 14 is able to slide in a direction z (see FIG. 4), transverse to the direction of conveyor movement, and generally in a plane parallel to the upper surface of base member 24.

Also, mounted between base number 24 and lower plate 40 are rollers 54 and 56 which engage oppositely disposed locator rails (only locator rail 18 is shown in FIGS. 1—3) of conveyor bucket locator rails 18 and 20, respectively. As discussed above, rollers 54,56 assist in stabilizing, and guiding and directing the bucket as it is moved along the conveyor path by the conveyor drive chains 58,60.

Conveyor mounting plate 36 is secured to conveyor drive chains 58 and 60 by means of pairs of chain blocks 66 and 68, attached to rod retainers 62 and 64, respectively. The rod retainers 62, 64 interconnect two transverse rods 63. Plate 36 is secured to rod retainers 62, 64 by any suitable attachment means such as bolts 65.

The leading wall member 26, although mounted in a vertically upstanding relationship to the surface of the base member 24, is also mounted for pivoting movement about vertical axis Y—Y (FIG. 1), as will hereinafter be described.

With reference to FIGS. 1–3 and FIGS. 5–7, generally designated as 80 is a wall member actuating assembly, which includes a swivel hub assembly. Actuating assembly 80 provides a mechanism which, when activated, will cause leading wall 26 to be pivoted in relation to base member 24 about axis Y—Y. As will be described in detail hereafter, actuating apparatus 80 interacts with another actuating apparatus, in these embodiments the cam rails, during movement of the buckets 14 along conveyor locator rails 18,20 to activate actuating assembly 80.

Base 24 and extension portion 39 of medial plate 38 have circular openings extending therethrough and are configured to receive a hub assembly 80. This hub assembly 80 comprises a metal cylindrical sleeve 82 having a hollow metal lined cylindrical interior passageway forming a bushing for a revolving shaft 86 which is received therein and is centered about axis Y—Y. The cylindrical sleeve 82 is secured in position that is relative to base 24 by means of a circular metal plate 41 FIG. 7) which is secured to both sleeve 82 such as for example by welding, and to base 24, for example by screws which are screwed through holes in the plate 41 into the top surface of base member 24. Metal plate 41 is set into a recess within the upper surface of base 24 so that the top surface of metal plate 41 is flush with or below the top surface of base member 24, Thus plate 41 does not interfere with the rotational movement of the leading wall 26 when it pivots with shaft 26 about axis Y—Y.

Passing through the bushing formed in sleeve 82 is a cylindrical metal shaft 86. The top end 99 of shaft 86 extends beyond the top surface of base 24 and is received in an opening within leading wall 26. The top end 99 can be permanently embedded, affixed, or formed within the opening in leading wall 26. Leading wall member 26 may be permanently pinned in position. Thus leading wall 26 rotates with shaft 86 to provide for pivoting movement of the leading wall with shaft 86 about axis Y—Y. The permanent affixation of the shaft relative to the wall assists in ensuring that each bucket 14 of conveyor 16 is constructed alike and will be placed and maintained in the same relative position during use (i.e., each leading wall will be fixed at the same relative position compared to its shaft).

The lower end 100 of shaft 86 is secured to a radial extending lever arm or cam follower arm 102 at the end of which is a cam follower roller 104. Cam follower roller 104 is mounted for free rotational movement at the end of lever arm 102. Lever arm 102 pivots with shaft 86 and is fixed in position in relation to the shaft. The mounting of lever arm 102 onto shaft 86 is assisted by a locator key. This locator key ensures that all buckets on the conveyor have their lever arm in the same relative position to their respective shaft.

The advantage of permanently securing the rotational positions of each bucket wall relative to the shaft and the corresponding lever arm 102 is that all buckets should have the same movement of their leading wall 26 as the buckets move along the common conveyor path.

With reference to FIGS. 1 and 4, a cam rail 116 is shown, positioned on one side of lever arm 102 and roller 104. In the vicinity of the carton loading station 12, a corresponding rail 115 is positioned on the opposite side of roller 104 (see FIG. 4). The gap between rails 115 and 116 is wide enough to permit roller 104 to be received therebetween, and when the roller is positioned between rails 115 and 116, the rotational position of leading wall 26 is substantially fixed.

Referring again to FIGS. 1–3 and 5–7, an extension spring 108 stretches between a pin 110 which is secured to the bucket base member 24 and a pin 112 which is secured to a transverse plate formed as part of leading wall 26. Spring 108 provides a force tending to rotate the leading wall member 26 in a clockwise rotation about axis Y—Y. A stop member 120 is provided at the top surface of base member 24 and will prevent further clockwise rotation of leading wall 26 beyond a certain position. Thus, if there is no biasing force being exerted by rail 116 on cam follower roller 104, leading wall 26 will rotate clockwise until the first side opening end portion 26a of leading wall 26 abuts stop 120. This is the initial position from which the leading wall 26 will move once it is subject to a force applied via cam follower 104.

As the bucket moves along the track (see FIG. 4) the position of the bucket relative to the cam rail 116, will determine whether the roller 104 is in contact with the cam rail 116. As the relative position changes, the roller will be moved as the cam rail 116 pushes against it. The rotational force exerted by the cam rail 116 on the roller will be sufficient to counteract the torque created by the force of the springs. Viewed from another perspective, the effect of the spring force exerted between the base 24 and leading wall 26, is that cam follower roller 104 is, at least at some positions along the path of buckets 12, biased against cam rail 116. As will be described in greater detail hereinafter, cam rails 116 are positioned at both the bucket loading station and at a carton loading station 12 (FIG. 4). The cam rails 115 and 116 are positioned slightly below and between the conveyor bucket locator rails 18 and 20 so that particularly cam rail 116, can be engaged by cam follower roller 104. As the position of cam rail 116 changes relative to the conveyor bucket locator rails 18 and 20, and thus relative to each bucket 14, the interaction between the cam rail 116 and lever arm 102 will cause lever arm's rotational position to change, thus changing the relative rotational position of the leading wall 26 relative to base 24.

For the purposes of contrast, FIG. 7 shows two buckets 14A and 14B, in two different orientations. It would, however, be unusual to have two buckets next to each other on the conveyor, with such differing orientations. Bucket 14A has its leading wall 26A positioned such that is provides a relatively narrow side outlet opening 32 compared to the other orientation of leading wall 26B, and sized to the opening of carton 23A. Leading wall 26B of bucket 14B, on the other hand, is oriented so that the side outlet opening is sized corresponding to the size of the opening of a carton 23B. As shown in broken lines, when moved to the discharge position the buckets will have moved to a position close to the carton crease line (X—X in FIG. 6). The corresponding rotational positions of lever arms 102A and 102B can also be observed in FIG. 7.

It should be noted that the minimum width of the bucket opening will be slightly less than the width of the carton. Thus if the carton opening is 7 ½ inches wide, The minimum size of the bucket opening is preferably between 7 and 7 ¼ inches. This permits the leading and trailing walls of the bucket to be able to be appropriately positioned in relation to the carton.

With reference once more to FIG. 5, two buckets 14 in series on conveyor 16 are shown. These buckets are shown while in the vicinity of carton loading station 12. Two transverse item pushers 47 and 49 are shown. These pushers are part of a conventional bucket item discharge or unloading device. Each of pushers 47 and 49 of The device moves longitudinally with the bucket conveyor 16 and the carton conveyor, all at the same speed. This permits a pusher such as 47 or 49, to move transversely through the interior space of the bucket, pushing out the one or more items carried therein, from the bucket and into an aligned carton carried in an carton holder. This particular aspect of the movement of the buckets on the bucket conveyor, the movement of the cartons on the carton conveyor and movement of the pushers on the bucket unloading device is conventional and known to those skilled in the art.

Figure 8A:
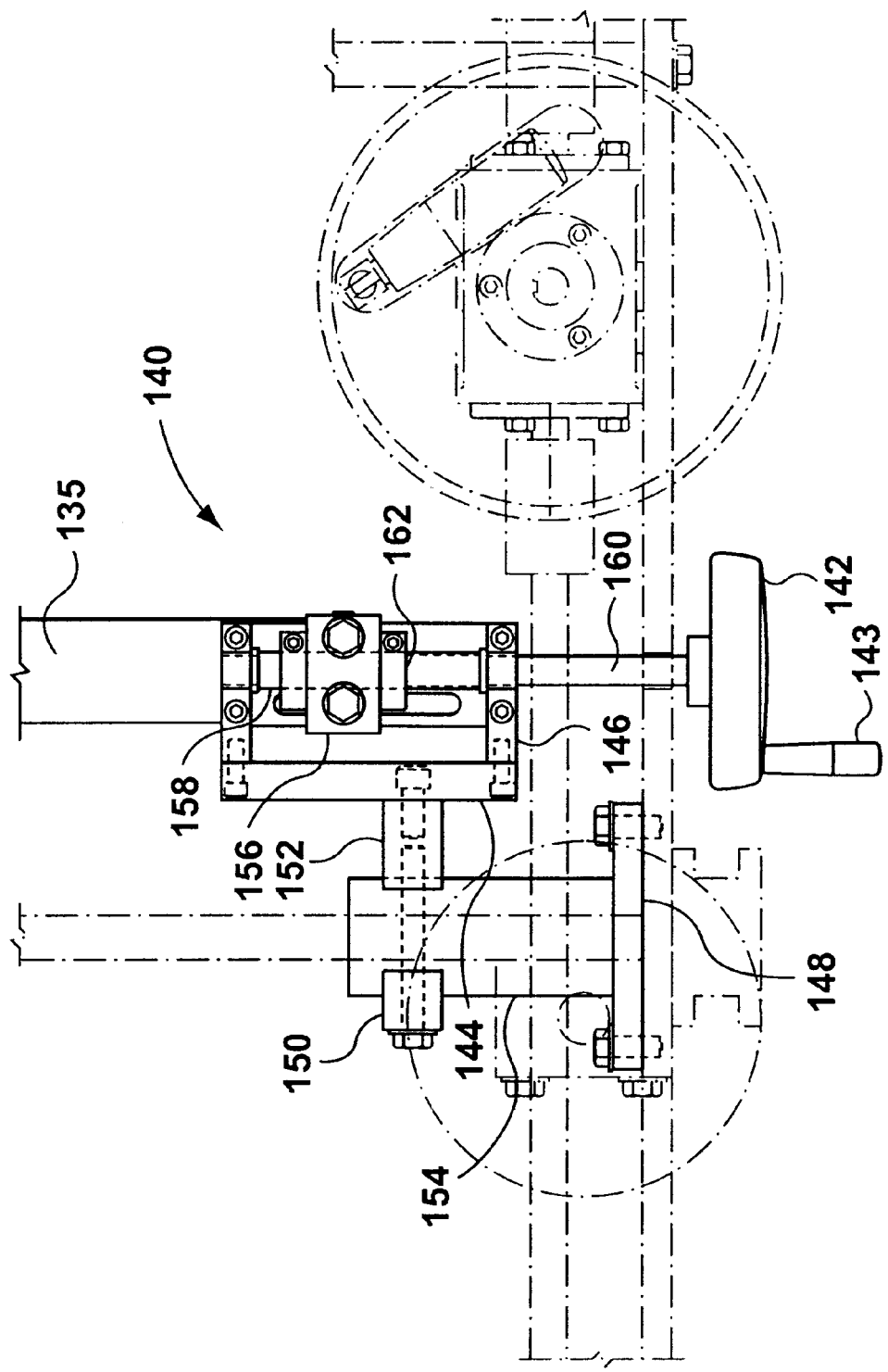
FIGS. 8a and 8b are enlarged portions 8a and 8b of FIG. 8.
Figure 8B:
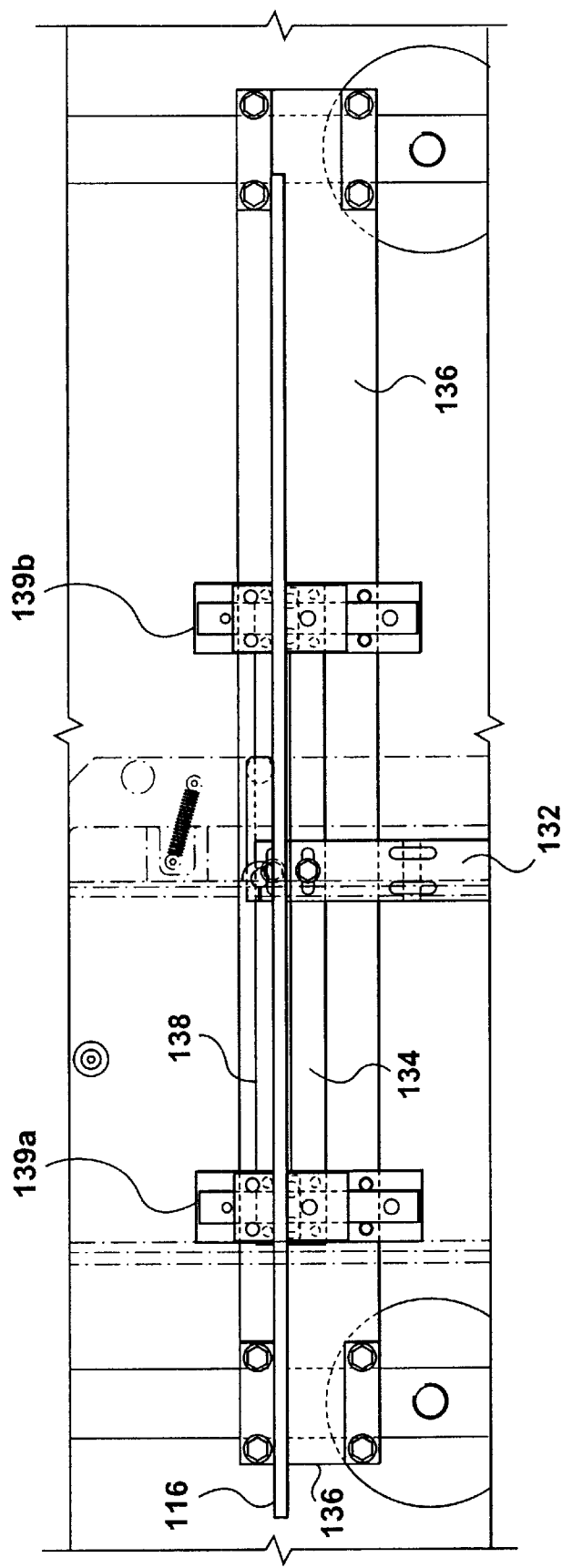
Figure 9:
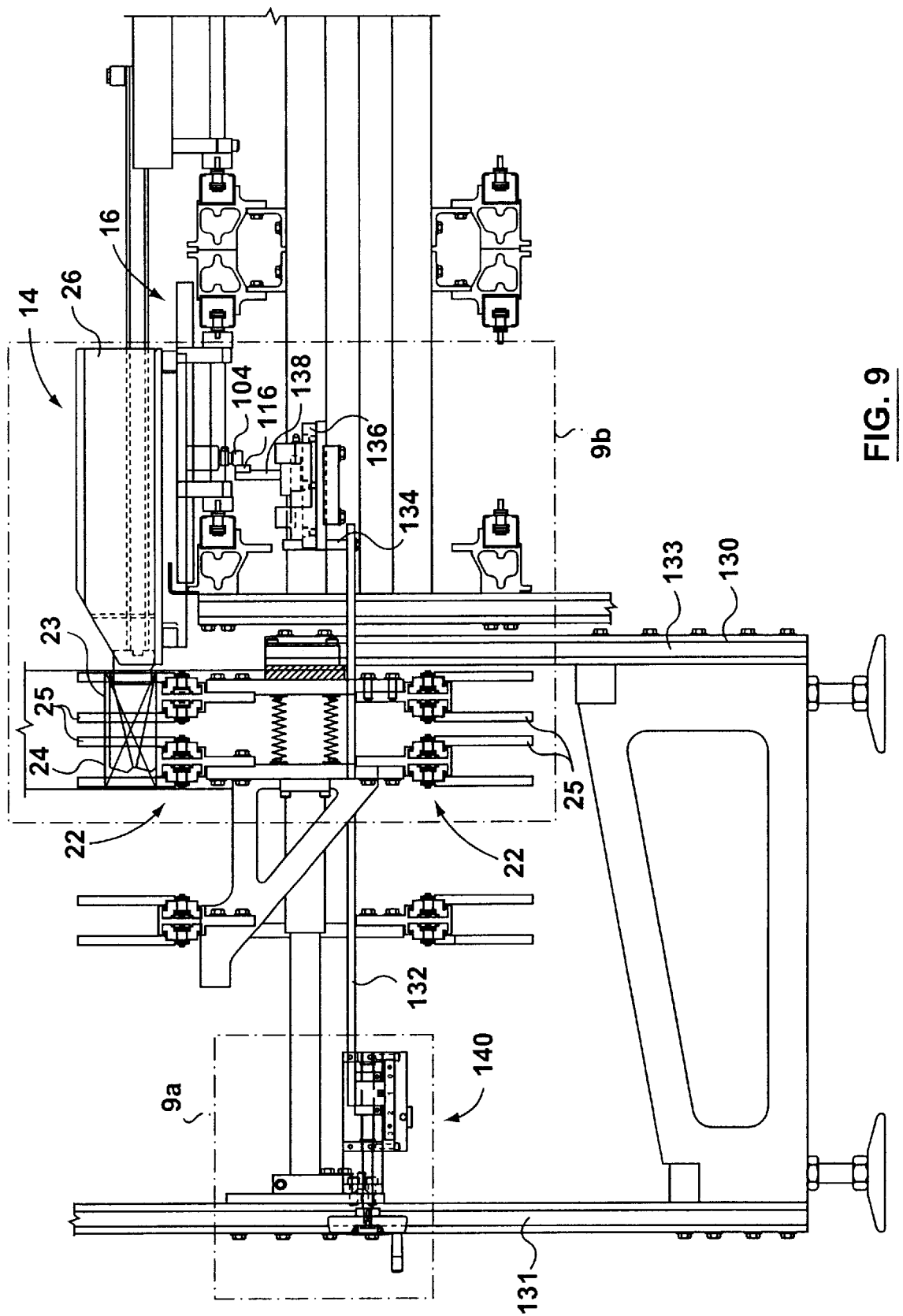
FIG. 9 is a side elevation view at 9—9 in FIG. 8
Figure 9A:
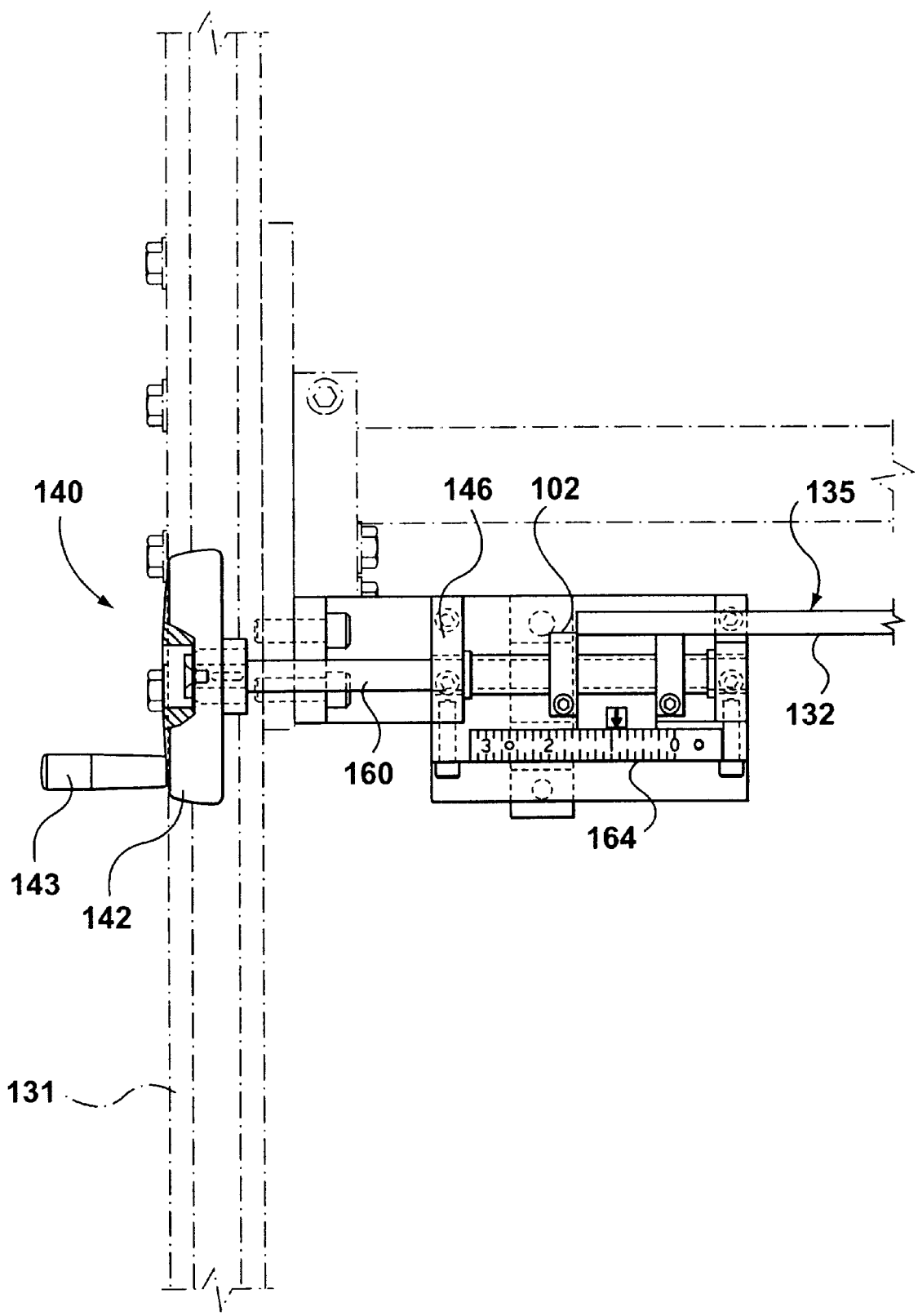
FIGS. 9a and 9b are enlarged portions 9a and 9b of FIG. 9.
Figure 9B:
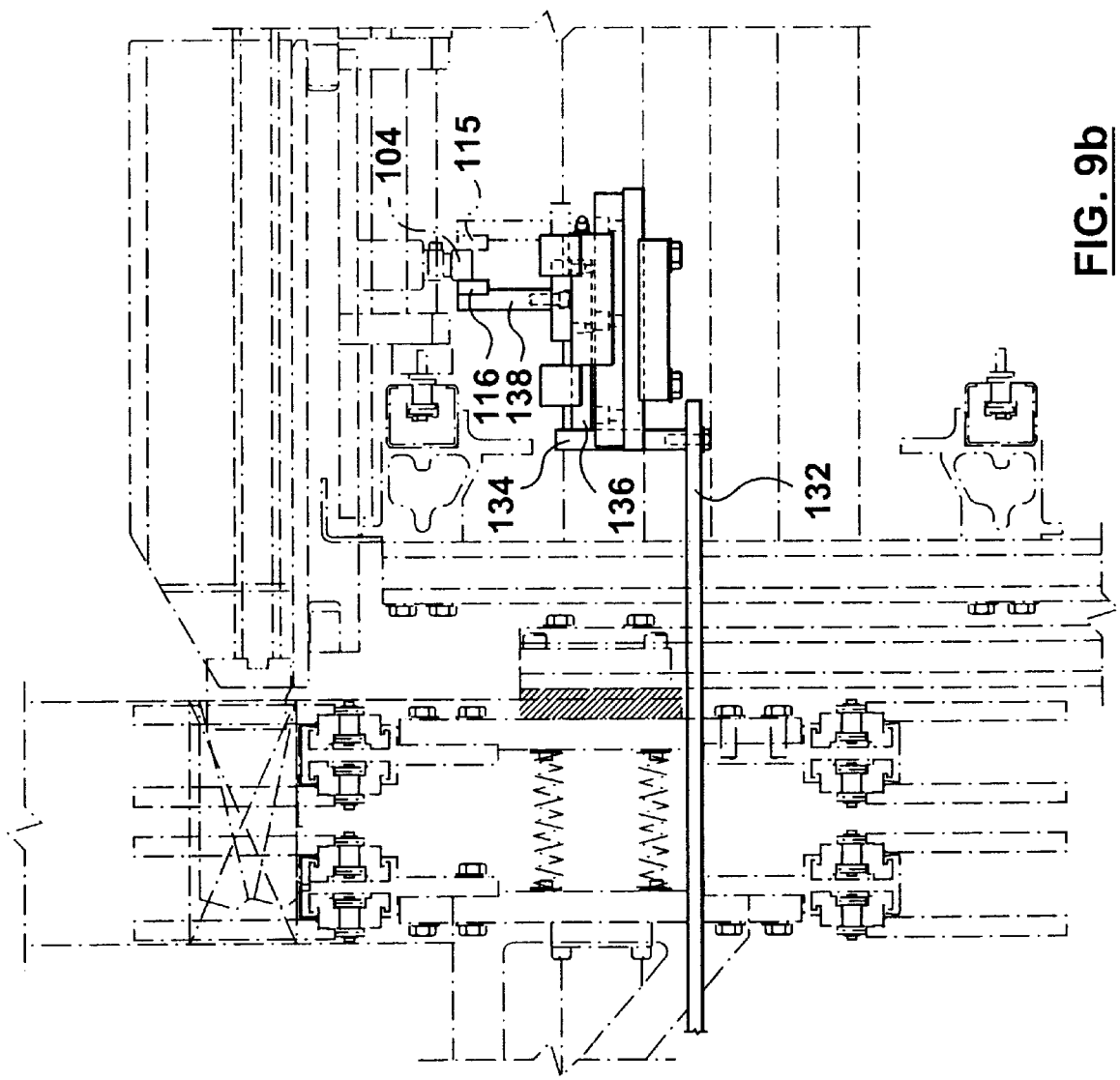

In FIGS. 8 and 9, important features of the bucket unloading/carton loading station generally designated 12 are shown. In FIGS. 8a, 8b and 9a, 9c, for clarity, the specific features associated with the cam rail adjustment mechanism and the cam rail mounting assembly are shown in enlarged detail, with other features associated with the conveyor system being shown in dotted outline. At carton loading station 12, bucket conveyor 16 moves a series of buckets through the station 12 (only two buckets 12 are shown in FIG. 8 for simplicity). As mentioned above, at an unloading position, a bucket 14 is aligned with a carton 23 held between a pair of carton holders 24,25 carried by carton loader 22. As can be seen in FIGS. 8, 9 and 9b, cam rail 116 is part of a cam rail assembly that is secured to frame 130. The cam rail assembly includes a bar 132 stretching transversely across frame support 131 and frame support 133. Bar 132 provides the linkage between the adjustment assembly mounted to frame support 131 and the cam rail mounting assembly itself. Thus, when bar 132 is moved by the adjustment assembly, this causes the cam rail assembly to have its horizontal position altered, including the position of the cam rail 116 itself.

As part of the cam rail mounting assembly, vertically upstanding plate 134 is secured at its lower end to bar 132. At its upper end, vertical plate 134 supports a horizontal plate 136. Connected to plate 136 are a plurality of other interconnecting plates including a mounting plate 138 which is directly secured to cam rail 116. It will be observed that cam rail 116 only extends longitudinally through the vicinity of the carton loading station.

With reference to FIGS. 8 and 8b, a pair of spaced linear bearings 139a, 139b are shown. These bearings are conventional can be THK's LM SSR linear guide. The purpose of these guides/bearings is to support the weight of the cam rail assembly, while at the same time permitting the transverse movement of that rail assembly on those bearings In FIG. 9b, in addition to cam rail 116, second cam rail 115 is also shown in broken lines. Cam rail 115, as described above, stretchs through that portion of the carton loading station where the transfer of the item from the bucket to the carton takes place. Cam rail 115 is also mounted through plates to bar 132, and thus its transverse position relative to cam rail 116 is fixed Proximate the opposite end 135 of bar 132 is a cam rail position adjustment assembly generally designated 140. Assembly 140 comprises a rotatable handwheel 142 having a cranking handle 143, and a base plate 144. The base plate 144 is held by C-clamps 150,152 affixed to a frame bar 154, which in turn is mounted to the frame 131 by a mounting plate 148. Attached to mounting plate 144 is an adjusting screw mounting plate 146 which permits the hard-wheel shaft 160 to pass therethrough. Secured to bar 132 is a threaded collar 162 which is adapted to receive the threaded end of hand-wheel shaft 160.

By rotation of hand-wheel 142, shaft 160 will turn causing it to move within collar 162 causing movement of collar 162 relative to shaft 160. As the transverse position of shaft 160 is fixed relative to the frame, the rotation of the shaft 160 will cause collar 162 to move relative to the frame. As collar 162 is fixed to bar 132 and collar 162 moves, so will bar 132, along with the cam rail mounting assembly. Thus, rotation of hand-wheel 142 causes movement of bar 132 longitudinally toward or away from frame 132, thus causing rail 116 to move in a horizontally transverse direction relative to the frame and relative to the locator rails 18 and 20.

The change in relative position of cam rails 116 and 115 relative to the frame and conveyor bucket locator rails 118,120 means that there is also a change in horizontal transverse position of the rails relative to the path of each of the buckets 14. Accordingly, for each bucket at a given position along the bucket path, the lever arm will, when its cam roller 104, is in abutment with the cam rail 116, have a different rotational position about axis Y—Y when the position of the rails is altered. Accordingly, the rotational position of the leading wall 26, at any position along its path while cam follower 104 is in abutment with the cam rail 116, can thus be adjusted, by adjustment of the position of the cam rails 115 and 116.

Figure 10:
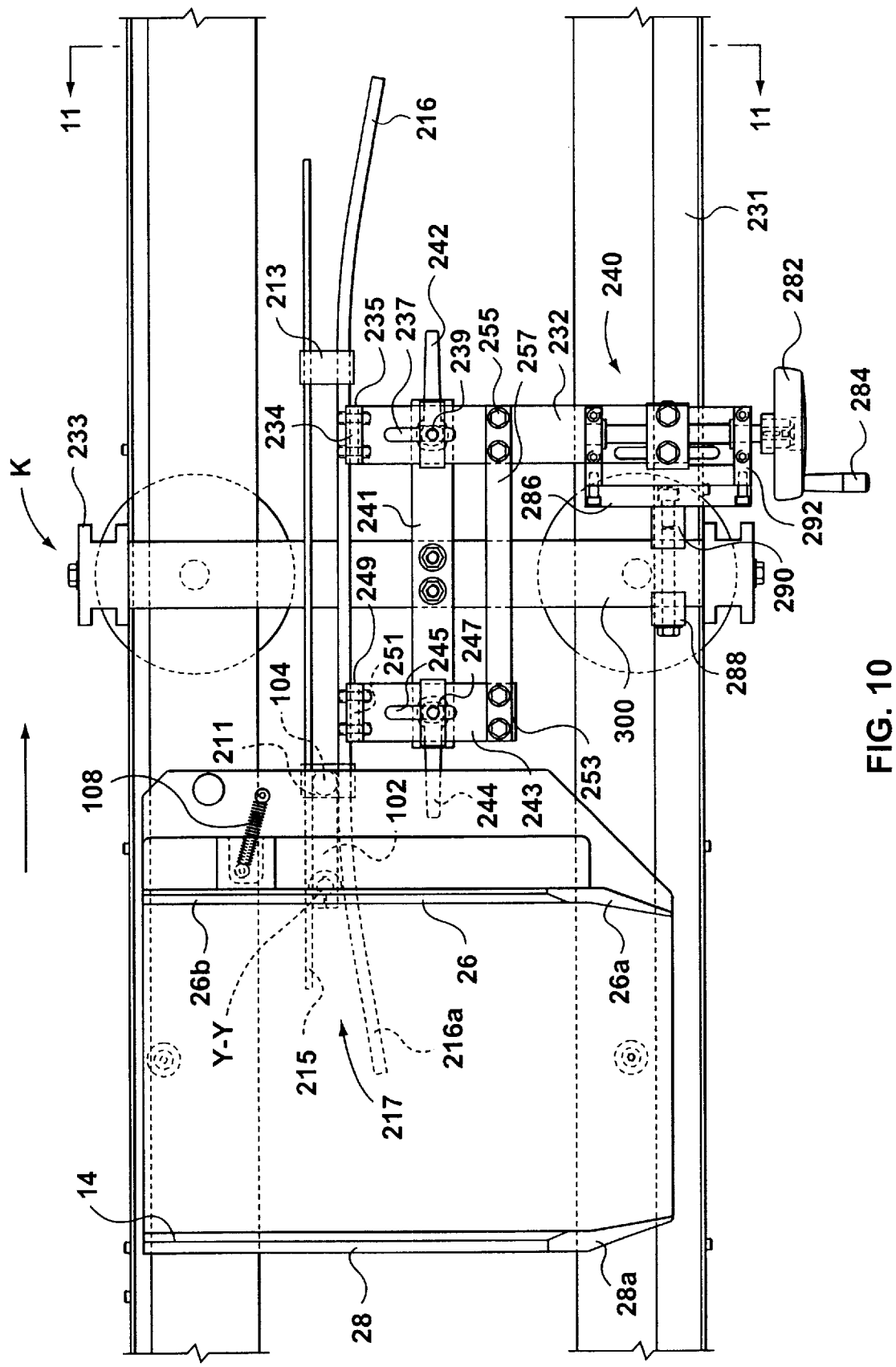
FIG. 10 is a top plan view of a bucket loading station in the bucket conveyor system.
Figure 11:
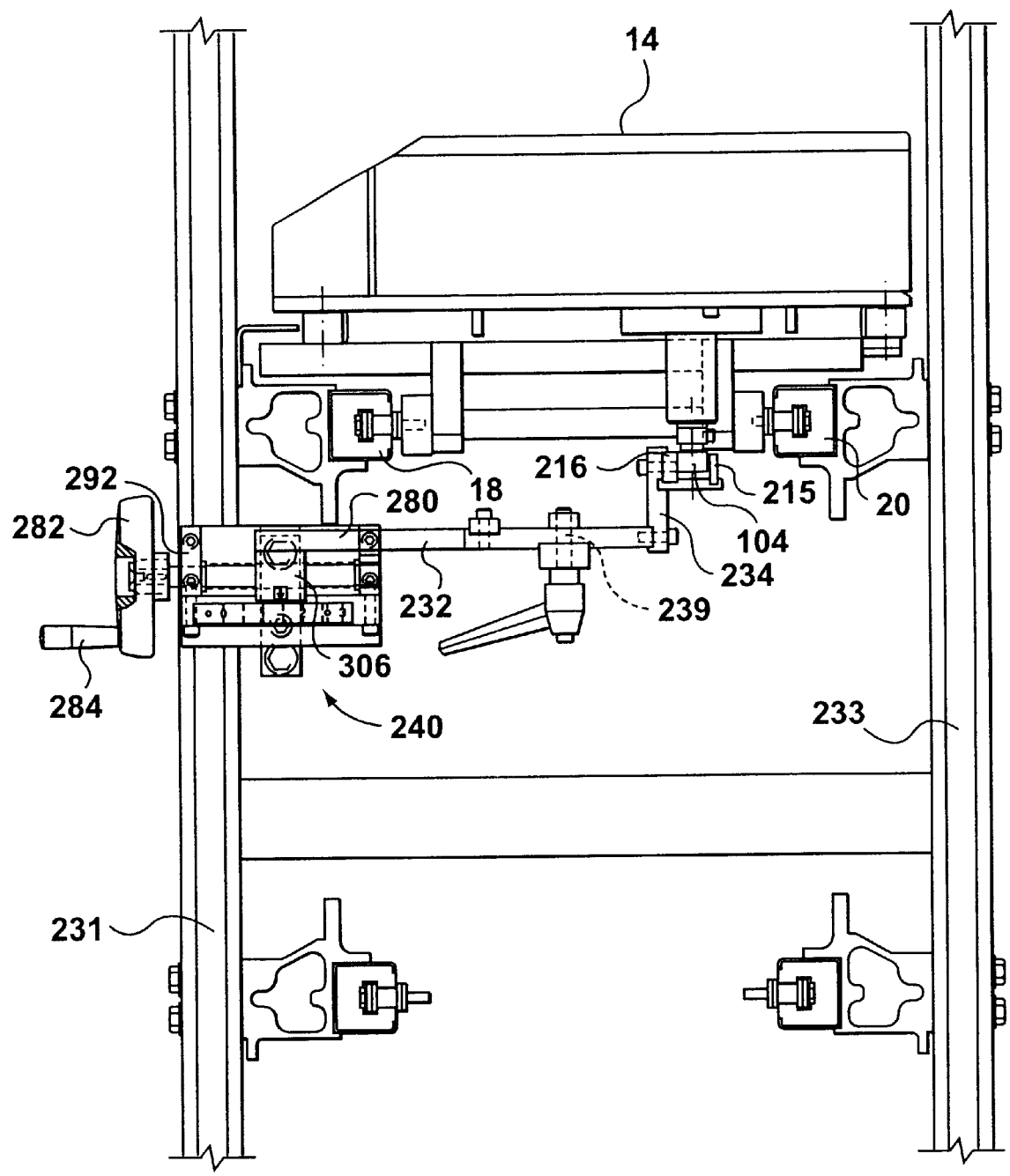
FIG. 11 is a side elevation view at 11—11 in FIG. 10.

FIGS. 10 and 11 illustrate a cam rail assembly arrangement for a bucket loading or in-feed station, which is very similar in structure to the cam rail assembly at the carton loading station just discussed.

FIGS. 10 and 11 illustrate a cam rail assembly arrangement for one possible bucket loading or in-feed station, which is very similar in structure to the cam rail assembly at the carton loading station just discussed. In another embodiment of the system, the bucket loading station may be conventional, in which case the buckets would move through the bucket loading station with the bucket's leading wall 26 being in abutment with the stop 120.

In the embodiment shown, the cam rail assembly at the bucket loading station includes a cam rail 216 along with a second guiding rail 215. Rails 215 and 216 are held in fixed relationship to each other by brackets 211 and 213. A slot 217 is provided between the two rails 215 and 216 and is sized to permit roller 104 of lever arm 102 to pass therebetween. The horizontal positioning of cam rail 216 is such that as a bucket 14 carrying a roller 104 moves through the station, the abutment of roller 104 with rail 216 causes leading wall 26 to rotate about axis Y—Y in a manner similar to that described above at the carton loading station. Rail 215 ensures that during the bucket loading process, the items being loaded into the bucket to not press against leading wall 26, rotating the wall to an over-extended position.

A longitudinal plate 232 stretches transversely from frame support 231 to opposed frame support 233. The end 235 of plate 232 is attached to cam rail 216 by a vertical rail mounting plate 234. Set back from the end 235 of plate 232 is a slot 237. An upstanding pin 239 is received in slot 237 and provides for guidance of the plate 232 as it is moved transversely by the adjustment mechanism as will hereinafter be described. Thus, plate 232 acts as a right side, guide plate for the cam rails 215 and 216.

A longitudinal plate 232 stretches transversely from frame support 231 toward the opposite frame support 231. The end 235 of plate 232 is attached to cam rail 216 by a vertical rail mounting relationship from end 249 of plate 243. Pins 239 and 247 are affixed upstanding from opposite ends of longitudinally oriented support plate 241. Thus the pin-in-slot combinations provide for left and right side guidance for the cam rails 216 and 215 as both plates 232 and 243 are moved transversely by the adjustment mechanism as will hereinafter be described.

Pins 239 and 247 provide a linkage between the adjustment assembly 240 mounted to the frame support 231 and the cam rail mounting assembly. Secured to each of pins 239 and 247 are rotatable locking assemblies 242 and 244. Each locking assembly is adapted to be moved from an open unlocked position, in which the cam rail assembly can be moved transversely relative to plate 232, and a locked position, wherein the cam rail assembly is fixed transversely relative to plate 232.

A connecting bar 257 is affixed at each end, one end to end 253 of plate 243, the other end to a medial position 255 of plate 232. Thus connecting bar 257, by stretching between left guide plate 243 and plate 232, provides greater rigidity to this overall cam rail structure.

It will be observed that as in the carton loading station, at the bucket loading station cam rail 216 and guide rail 215 only extends longitudinally in the vicinity station.

Proximate the opposite end 280 of bar 232 is a cam rail position adjustment assembly generally designated 240, which is very similar in structure to the adjustment assembly 140 at the carton loading station. Assembly 240 comprises a rotatable hand-wheel 282 having a cranking handle 284, and a mounting plate 286. The mounting plate is held by C-clamps 288,290 affixed to a frame bar 300, which in turn is mounted to the frame support 231. Attached to mounting plate 286, is an adjusting screw mounting plate 302 which permits an adjusting screw 235 attached at one end to hand-wheel 282 to pass therethrough. Secured to bar 232 is a threaded collar 306, which is adapted to receive adjusting screw therethrough.

By rotation of hand-wheel 282, the adjusting screw 235 will turn in collar 306. As the longitudinal position of screw 235 is fixed relative to the frame, the rotation of the screw will cause bar 232 and guide bar 243, to move longitudinally toward or away from frame 231, thus causing rails 216 and 215 to move horizontally relative to the frame and relative to the conveyor track 118 and 120. The change in relative position of rail 216 relative to the frame and to conveyor bucket locator rails 18,20 means that there is also a change in horizontal position relative to the bucket 14. Accordingly, the lever arm 102 will, when its cam roller 104 is in abutment with the cam rail 116, have a different rotational position about axis Y—Y. Accordingly, for any position along the bucket's path at the station, the rotational position of the leading wall 26 can thus be adjusted, by adjustment of the position of the cam rail 216 using assembly adjustment mechanism 240.

Figure 4A:
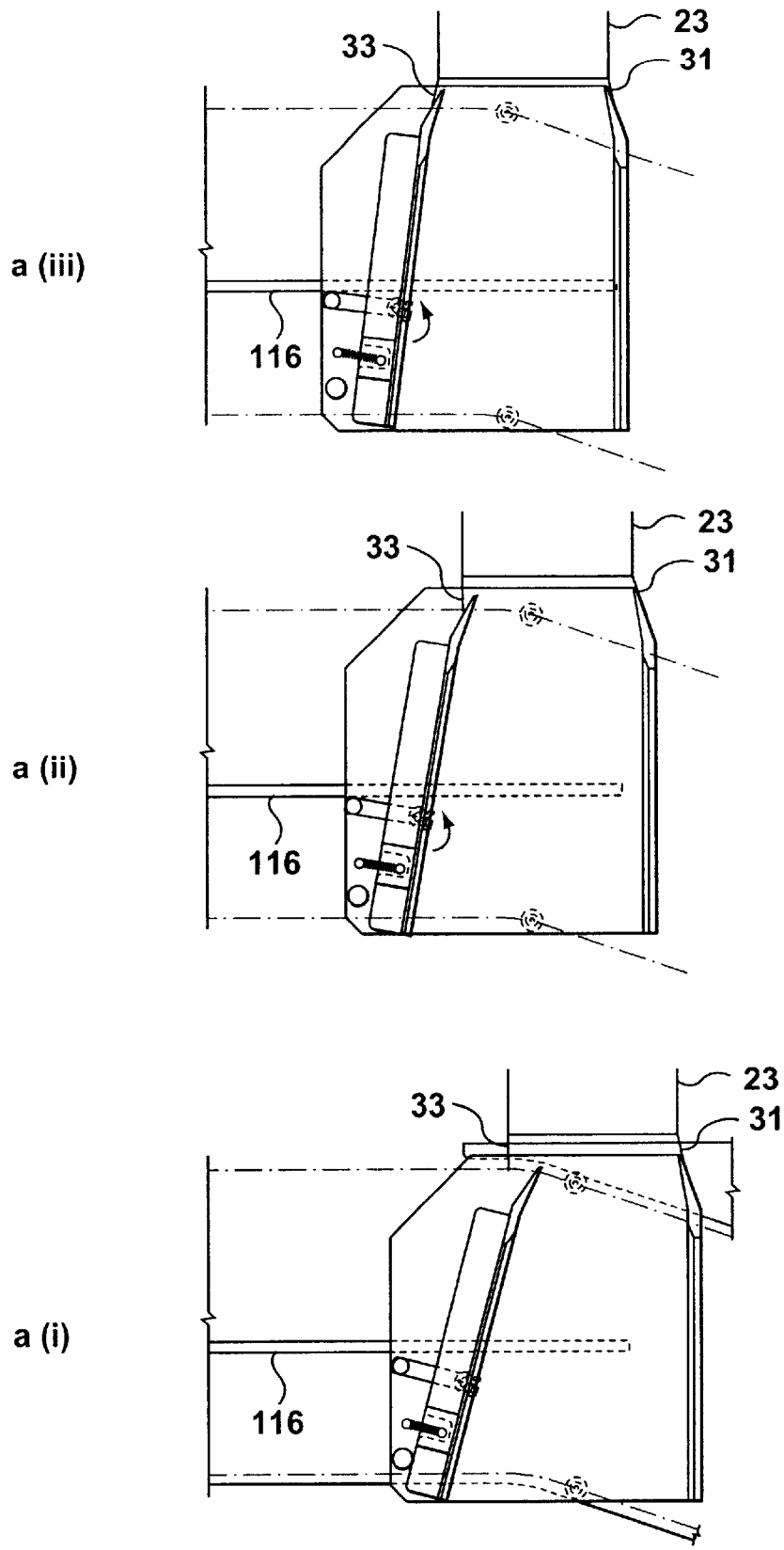
FIG. 4a is a top schematic plan view of one of the buckets of FIG. 4 identified 4a, shown in three different positions.
Figure 5:
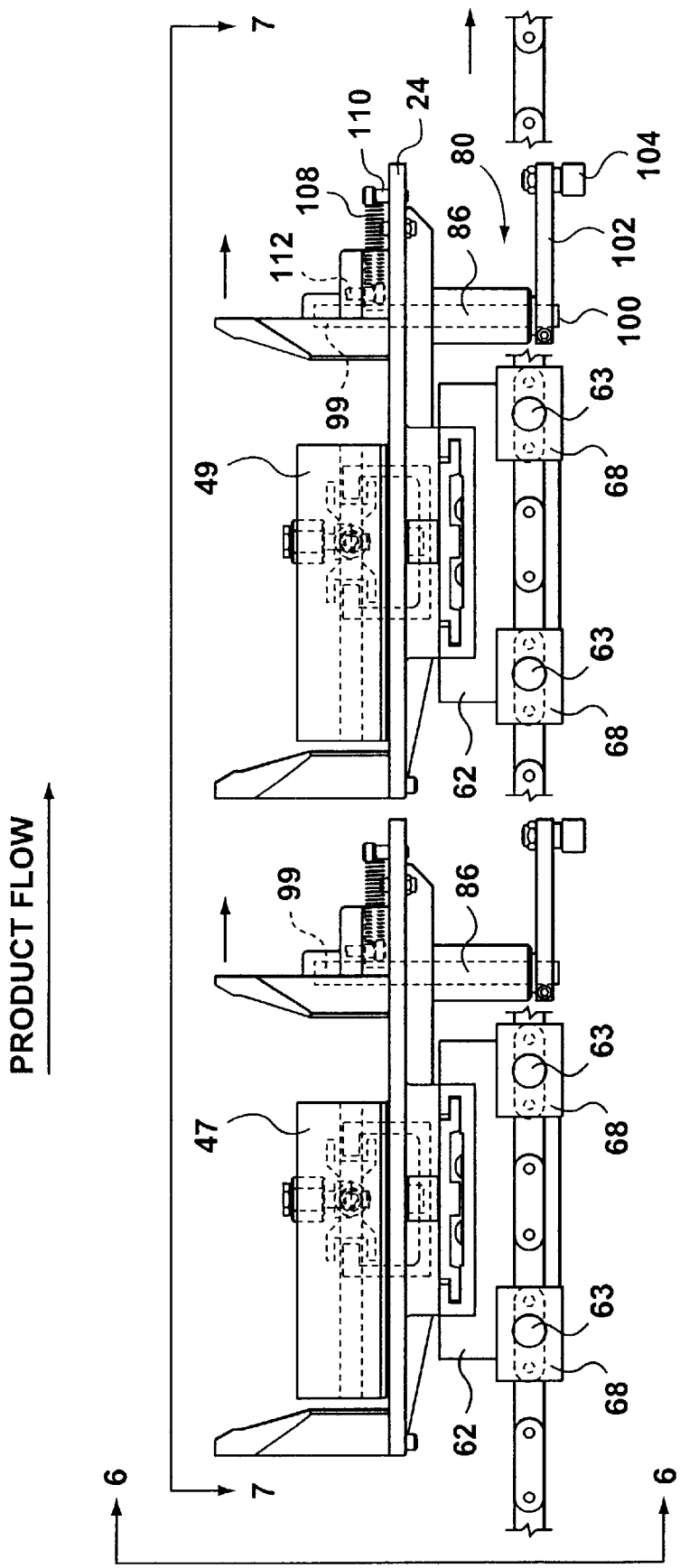
FIG. 5 is a front elevation view of the part of the system of FIG. 1.
Figure 6:
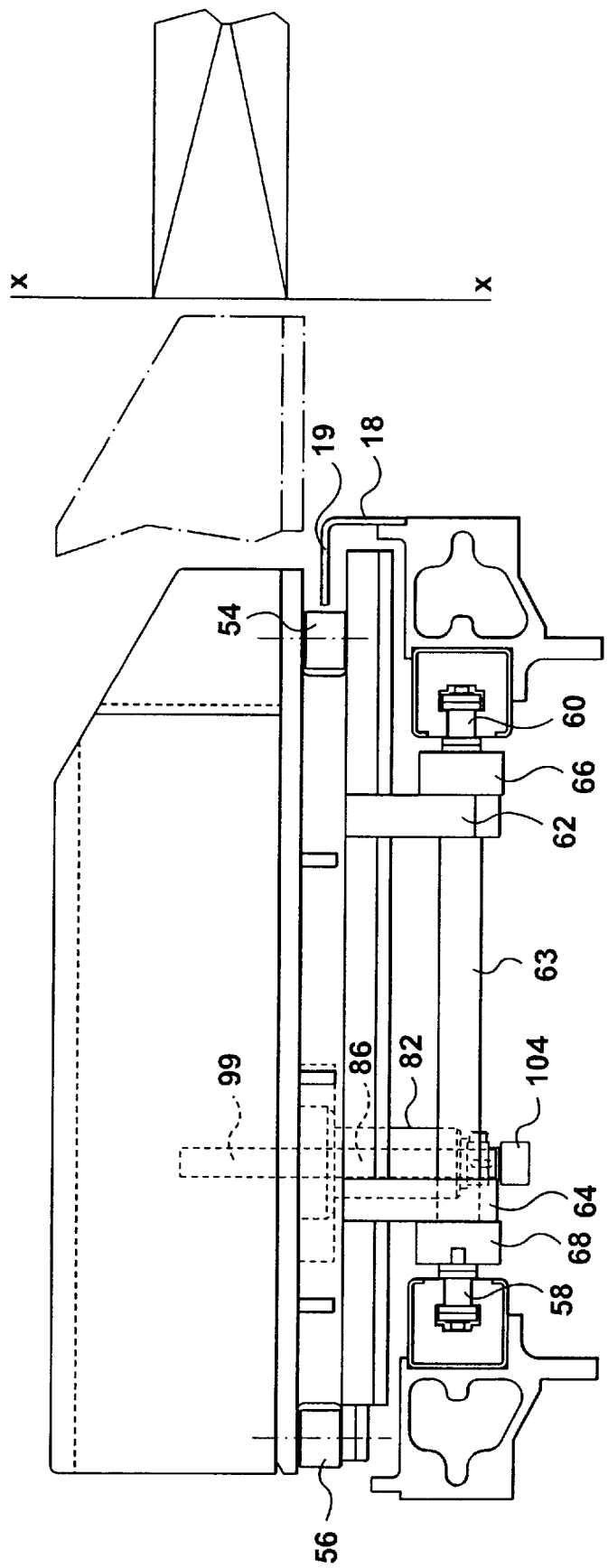
FIG. 6 is a side elevation view at 6—6 in FIG. 5.

With reference to FIGS. 4 and 4a, the sequential movement of a bucket 14 through a bucket unloading/carton loading station, such as the carton loading station in FIG. 8, is shown. Each of the buckets 14 moves from position z through to position d, identified in FIG. 4. There is also the corresponding longitudinal movement of a series of cartons 23 carried in carton holders 24,25 of carton conveyor 22. The buckets 14 are mounted at the same pitch on conveyor 16, as the pitch of cartons 23 on conveyor 22. Additionally, the carton conveyor 22 and the bucket conveyor 16, move at the same speed in the direction x. Thus when conveyor 16 and conveyor 23 are moving in the same direction, as for example as both cartons 23 and buckets 14, move longitudinally in the direction x, from positions (c) to (d). However, it will be appreciated that the buckets on conveyor 16 may have an additional movement in the direction z which is effected by the camming action of the rails 18 or 20 on the rollers 54 or 56 of each bucket. Thus, although the relevant position of a bucket on conveyor 16 and a carton 23 of conveyor 22 will not change, the relative position in the z direction will change. This occurs for example, as a bucket 14 and a carton 23 move between position (z) and position (a).

At position (z), the bucket's cam follower 104 of lever arm 102, is not in engagement with cam rail 116, and due to the action of spring 108, the rear portion 26a of leading wall 26 is in abutment with stop 120.

Each bucket 14, as it moves between position (z) and position (a), is moving between rails 18 and 20 on conveyor 16. Through this portion of movement, there is a directional component of movement in the Z direction toward the carton conveyor 22 and the cartons 23 carried thereon, and toward the cam rail 116, as locator rail 20 exerts a camming force in direction z, on each bucket 14. At position (a), the bucket has moved to a position where cam follower 104 it is about to engage the cam rail 116.

In FIG. 4a, the sequential movement between positions between position (a) and position (b) are shown as positions a(i) To a(iii). Position a(i) in FIG. 4a is the same position (a) that is shown in FIG. 4. As The bucket moves from position a(i) to position a(ii), the bucket is moving closer to carton conveyor 22 and to rail 116. The result is that cam follower 104 engages cam rail 116, As the bucket moves closer towards the carton, a force is applied at cam follower 104 creating a torque to lever arm 102 about axis Y—Y. The torque applied to lever arm 102 is in a counter-clockwise direction in FIGS. 4 and 4a and it rotates the the shaft 86 and interconnected leading wall 26 about axis Y—Y, also in a counter-clockwise direction. This rotation of leading wall 26, widens the gap between leading wall 26 and trailing wall 28 at the bucket side outlet opening. The movement and positioning is co-ordinated so that as the rotation of leading wall 26 commences, front portion 26b starts to engage the inside surface of leading side flap 33 of a carton 23. At this stage, front portion 28b of trailing wall 28 will have probably engaged the inside surface of trailing side flap 31 of carton 23.

Between the positions a(ii) and a(iii), the bucket moves lightly closer to cam rail 116 and carton, continuing the rotation of leading wall 26 about axis Y—Y and pushing side flap 33 in an outward direction, clearing the carton opening.

By the time carton 23 and bucket 14 have reached position (b), the leading wall 26, in particular, the front portion 26a of leading wall 26 will have pushed aside flap 33, providing unobstructed access to the interior of carton 23. As the bucket 14 moves between positions (b) and (c), the position of leading wall 26 will not change. This permits an opportunity for bucket 14 to be unloaded of its one or more items, by conventional discharge loading means operating on-the-fly, such as a pushing mechanism, for example, the typical side acting pusher shown in FIG. 5.

After the bucket has been discharged, the bucket moves from position (c) to position (d). As it does so, the bucket moves away from carton conveyor 22 the bucket roller 54 having a camming force applied thereto by locator rail 18. As each bucket 14 moves away from the carton conveyor 22, cam follower 104 will gradually become disengaged from cam rail 116. By the time each bucket reaches position (d), the cam follower will no longer be in contact with cam rail 116; leading wall 26 will have rotated back in a clockwise direction until rear portion 26a comes into abutment with stop 120. Carton conveyor 22 will have moved the corresponding carton holders 24,25 away from the carton loading station so that the loaded carton can be further processed.

If it is desired to alter the size of carton 23 to be loaded, an adjustment can be made to the adjustment assembly such as that shown in FIGS. 8, 8a, 8b, 9, 9a and 9b. Rotation of the handwheel 142 will cause the cam rail assembly to move transversely, altering the transverse position of cam rail 186 relative to the conveyor rails 18 and 20 and bucket 14. As cam rail 116 is in engagement with cam follower 104, when bucket 14 is at a given position, such as position a(iii) in FIG. 4a, the relative position of cam follower 104 to bucket 14 will change, thereby adjusting the relative rotational position of lever arm 102 and leading wall 26. This will then result in a different spacing between the leading wall 26 and trailing wall 28 at the bucket side outlet opening, permitting the proper discharge of an item from bucket 14 into carton 23 of a different width opening.

In the preferred embodiment, similar principles of operation to that occurring at the carton loading station 12, also take place at bucket loading station, such as is shown in FIGS. 10 and 11. As each bucket 14 moves through die bucket loading station, the cam follower 104 moves within the slot 217 between guide rail 215 and cam rail 216. As the movement continues, cam follower 104 moves closer towards the cam rail 216, again due to a camming action of a locator rail on respective rollers of the buckets, in this case due to the shaping of portion 216a of cam rail 216. Eventually cam follower 104 starts to engage cam rail 216 and a force is applied to the cam follower and lever arm 102, creating a torque in a counter-clockwise direction about axis Y—Y. Due to the interconnection between lever arm 102, shaft 86 and leading wall 26, the leading wall will be rotated in a counter-clockwise direction, thereby widening the distance between front portions 26a and 28a.

In a manner similar to that discussed above in relation to the carton loading/bucket unloading station, the guiding rail 215 provides a corresponding position stablizer for the leading wall 26 during the item loading process, holding the lever arm and thus wall 26 in a generally fixed rotational position, The loading of the bucket 14 might take place at a hesitating bucket station at the bucket loading station, or intermittent movement could be provided by an indexing apparatus as is known in the art.

Once the bucket is loaded, the bucket 14 will move from the loading position (b) to (c), and gradually as the bucket moves away (being pushed away by the camming action of a locator rail on the respective roller of the bucket, the cam roller 104 will start to rotate in a clockwise direction, as the spring 108 acts on leading wall 26. Eventually the roller 104 will disengage from cam rail 216, such as when rear portion 26b of leading wall 26 has rotated into abutment with stop 120. At this position, leading wall and lever arm 102 can rotate no further, and roller 104 will disengage from cam rail 216.

Figure 12:
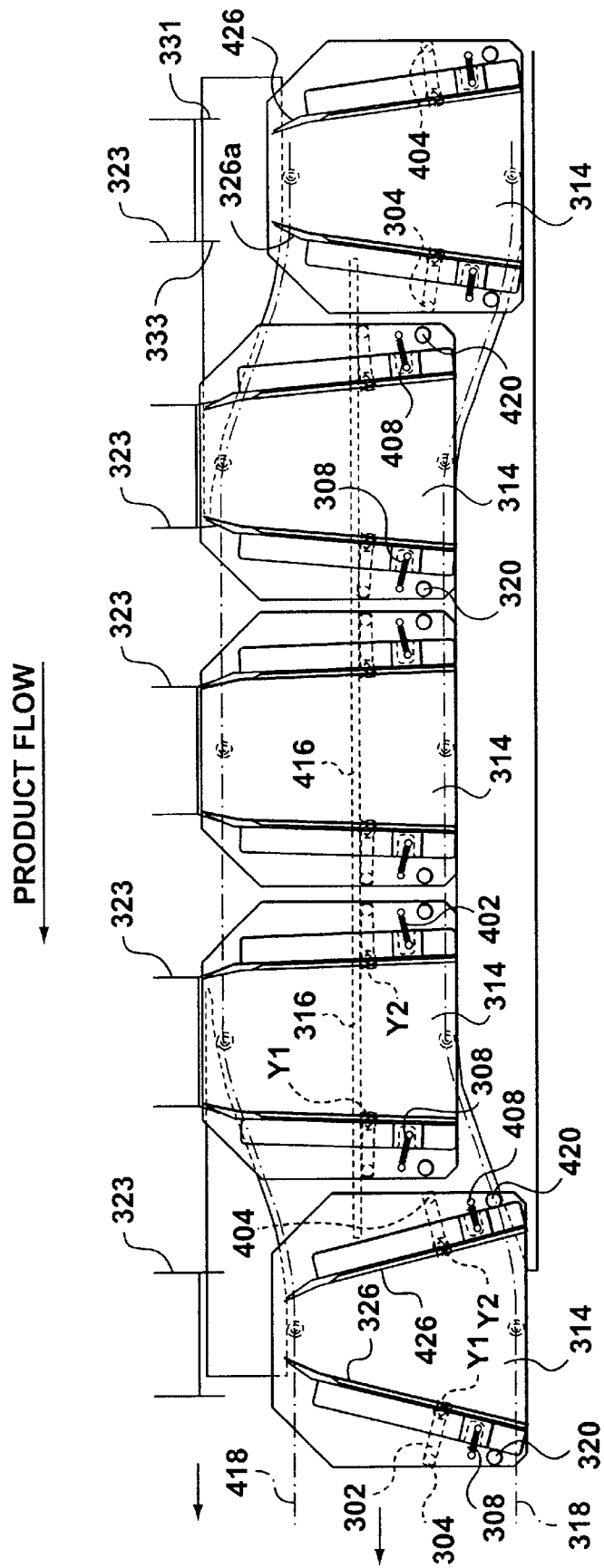
FIG. 12 is a top schematic plan view of a second embodiment of a system in accordance with the invention.

In FIG. 12, another embodiment is shown schematically. In this embodiment, buckets 314 are mounted on conveyor rails 318,418 of a conveyor. Buckets 314 pass along the path defined by conveyor rails 418 and 318. Buckets have leading walls 326 and trailing walls 426. In this embodiment both leading walls 326 and trailing walls 426 are mounted for pivoting movement about axes Y1 and Y2 respectively, facilitated by actuating assemblies corresponding to actuating assembly 80 described above. The movement of leading wall 326 through the station is the same as the movement of leading wall 26, as shown in FIG. 4. However, in this embodiment there is also a movement of trailing wall 426, as each bucket moves through the station. Due to the positions of rollers 304 and 404 in relation to cam rail 416, both front portions 326a and 426a will engage the inside surface of flaps 333 and 331 respectively, as each bucket moves into close proximity with a carton 323 carried by carton holders on a carton conveyor. Upon engagement of cam rollers 302 and 304 with cam rail 416, leading wall 326 and trailing wall 426 pivot outwards relative to the carton (leading wall 326 in a counterclockwise direction, and trailing wall 426 in a clockwise direction). The result is that leading wall 326 and trailing wall 426 push aside flaps 333 and 331 respectively, to clear the opening of carton 323.

Figure 13:
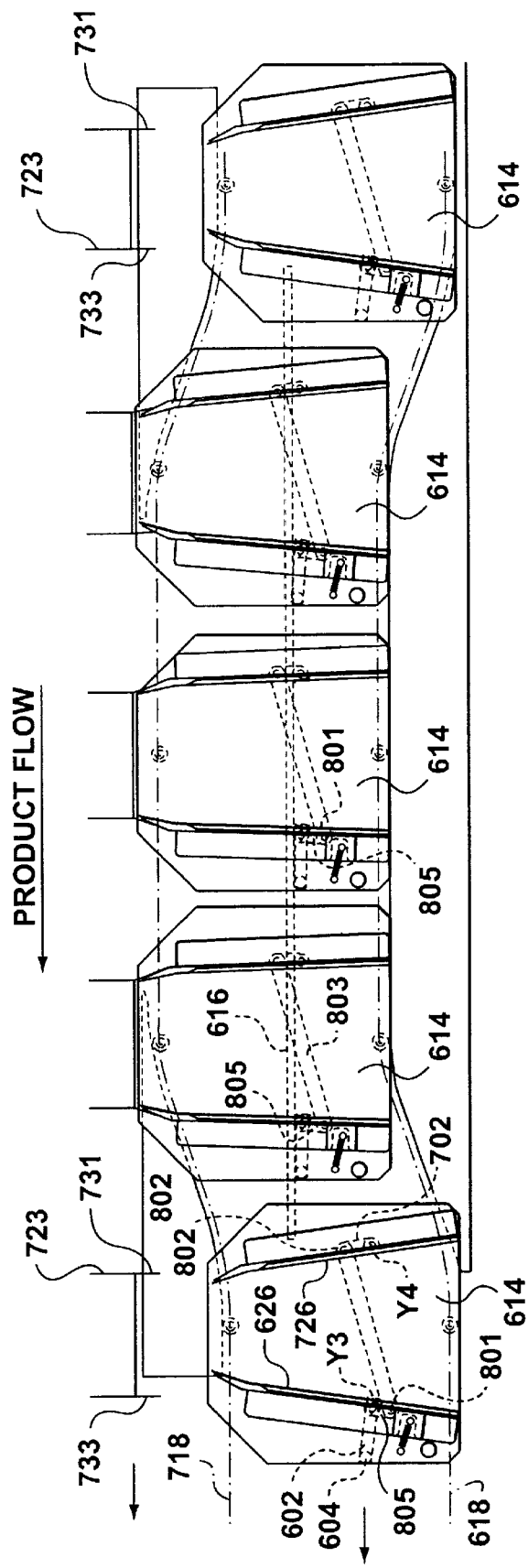
FIG. 13 is top schematic plan view of a third embodiment of the system in accordance with the invention.

Yet a further embodiment is shown in FIG. 13. In this embodiment, and as with the embodiment shown if FIG. 12, both leading wall 626 and trailing wall 726 are mounted for pivoting movement in relation to the bucket base. The only difference between the embodiment in FIG. 12, is that instead of having the lever arm of the actuating assembly of the trailing wall having a roller for engagement with the cam rail, the rotation of trailing wall 726 is effected by interconnection with the actuating assembly of the leading wall 626. This interconnection consists of a connecting rod 803 which at one end is pivotally connected to the end lever arm 702 at a pivot joint 802. The other end of connecting rod 803 is interconnected to one end of a second lever arm 805, at a pivot joint 801. The other end of second lever arm 805 is connected to the same shaft of the actuating assembly of leading wall 626, as lever arm 602.

The result is that rotation of leading wall 626 in one direction about axis Y3, will cause a corresponding rotation of trailing wall 726 in the opposite direction about axis Y4. Overall, the rotations of walls 626 and 726 as each bucket 614 as they move through the station is the same as the movement of buckets 314 in the embodiment in FIG. 12, Various other modifications and variations are contemplated, within the scope of the claimed invention. For example, it is possible to provide another type of flap pushing member as part of each bucket, aside from a wall, to engage the carton flaps. This would flap pushing member could be activated at a station by means other the change in relative position of the item holders relative to the carton holders. Some other variations include having the cam rail adjustment mechanisms motorized, so that it is not necessary to hand crank the adjustment. Also, the amount of adjustment could be controlled by a computer controller device.

We claim:

1. An article holder for a conveyor, said article holder comprising:
   a base member having an outlet side;
   a connector assembly for connecting and mounting said article holder to said conveyor;
   at least one moving wall member mounted to said base member for pivoting, rotational movement relative to said base member, said at least one moving wall member having an outlet portion located proximate said outlet side of said base member, said moving wall member being rotatable between a first position and a second position;
   said moving wall member being operatively interconnected to an actuating apparatus such that in operation, when said holder is at a station, said actuating apparatus is activated to cause pivoting rotational movement of said moving wall member between said first position and said second position relative to said base member.

2. A holder as claimed in claim 1 wherein said holder is adapted so that when said holder holding an item and a receptacle holder holding a receptacle having at least one side flap located at a side of a receptacle opening, are at said station, and said outlet side of said article holder is brought by said conveyor into close proximity with said receptacle, activation of said actuating apparatus causes said moving wall member to pivot between said first position and second position such that said outlet portion will push or maintain said at least one side flap away from said receptacle opening.

3. An article holder as claimed in claim 2, wherein said moving wall member is a flap pushing member and said actuating apparatus is activated in response to the movement of said holder by said conveyor.

4. An article holder as claimed in claim 3, wherein said flap pushing member is activated by movement of said holder by said conveyor to cause engagement of said actuating apparatus with a rail member, said engagement of said actuating apparatus with said rail member causing said actuating apparatus to move, thereby rotating said flap pushing member.

5. An article holder as claimed in claim 2 wherein said receptacle comprises a carton having a carton opening and a pair of oppositely disposed side panels, one of said side panels being engagable by said outlet portion of said moving member.

6. An article holder as claimed in claim 3, wherein said flap pushing member is mounted for pivoting movement between said first and second positions about a vertical axis oriented substantially perpendicular to said base, and said actuating apparatus comprises a lever arm interconnected to said flap pushing member, whereby movement of said lever arm causes said flap pushing member to rotate between said first and second positions.

7. An article holder as claimed in claim 6, wherein said flap pushing member is mounted on said base member for pivoting movement relative to said base member and said flap pushing member is upstanding from said base member.

8. An article holder as claimed in claim 7 wherein said flap pushing member comprises a first wall upstanding from said base member, said first wall having a wall portion extending proximate said outlet side of said base member to push said flap.

9. An article holder as claimed in claim 8, wherein said first wall comprises a first side wall having first and second ends, and wherein said article holder further comprises a second side wall upstanding from said base, said second side wall having first and second ends, said first side wall and said second side wall forming a discharge outlet at said outlet side of said base, between one of said first and second ends of said first side wall, and one of said first and second ends of said second side wall, whereby when said outlet side of said article holder is brought into close proximity with said receptacle, movement of said actuating apparatus causes said first side wall to move between said first position and said second position such that an end of said side wall pushes or maintains a side flap away from said receptacle opening.

10. An article holder comprising:
    a base member;
    a connector assembly for connecting and mounting said article holder to said conveyor;
    a first side wall member upstanding from said base member;
    a second side wall member upstanding from said base member and spaced from said first side member;
    said first and second side wall members being generally disposed opposite each other on said base to define an outlet;
    said second side wall member being mounted for pivoting movement relative to said first side wall member and said base, said second side wall member capable of pivoting rotational movement between a first position and a second position where in said first position the spacing between said first and second side wall members is narrower at said outlet than when said second side wall member is in said second position;
    a rotator adapted and operable to rotate said second wall member between said first and second positions.

11. An article holder as claimed in claim 10 wherein said rotator comprises a shaft attached proximate a first end thereof to said second side wall member, said shaft mounted for pivoting movement relative to said base member, said rotator further comprising a lever arm fixedly attached to said shaft, said lever arm being movable during operation to rotate said shaft and thereby rotate said second side wall member from said first position to said second position to increase the size of the spacing between said first side wall member and said second side wall member at said outlet.

12. An article holder as claimed in claim 11 further comprising a biasing device, for applying a torque in the direction opposite to the direction of the torque applied by said lever arm.

13. An article holder as claimed in claim 12 wherein said biasing device comprises a spring extended between said second member and said base member.

14. An article holder as claimed in claim 10 wherein said first side wall is mounted for pivoting rotational movement relative to said second side wall and said base between a first position and a second position, and wherein said rotator comprises a first rotator and further comprising a second rotator adapted to rotate said first side wall between said first and second positions, such that in operation said second rotator is operable to rotate said first side wall member between said first and second positions and in an opposite rotational direction to said second side wall member, such that when both said first and second side wall members are moved to said second positions, said spacing between said first and second side wall members at said outlet is increased.

15. An article holder conveyor system having a station, said system comprising:
    a conveyor having a conveyor path;
    a plurality of article holders mounted to said conveyor in series, each article holder adapted to be moved along said conveyor path by said conveyor, each said article holder comprising:
a base member having an outlet side;
a connector assembly for connecting and mounting said article holder to said conveyor;
a moving member mounted to said base member for pivoting rotational movement relative to said base member, said at least one moving member having an outlet portion located proximate said outlet side of said base member, said moving member being movable between a first position and a second position;
said moving member being interconnected to a first actuating apparatus such that in operation, movement of said actuating apparatus rotates said moving member between said first position and said second position relative to said base member;
a second actuating apparatus disposed proximate said conveyor, said second actuating apparatus co-operating with said first actuating apparatus of each article holder of said plurality of article holders in operation, such that as each article holder moves through said station, said moving member of each article holder is rotated between said first position and said second position by the interaction of said first actuating apparatus and said second actuating apparatus;
said system operable to move each of said outlet sides of each said article holder into close proximity with a receptacle at said station, each receptacle having a pair of opposed side flaps located on either side of a receptacle opening, and said system operable to move said first actuating apparatus and said second actuating apparatus relative to each other to cause said first actuating apparatus to interact with said second actuating apparatus to rotate said moving member between said first position and second position such that said outlet portion of said moving member can push a side flap of a receptacle that is blocking at least part of said opening away from said opening.

16. A system as claimed in claim 15, wherein said first actuating apparatus is adjustable to adjust at least one of said first and second positions of said moving member.

17. A system as claimed in claim 16 wherein said base member has a substantially horizontal surface and said moving member is mounted for pivoting rotation about a substantially vertical axis.

18. A system as claimed in claim 17 wherein said first actuating apparatus comprises a vertical shaft having a top end and a bottom end, said shaft being aligned with, and rotatable about, said vertical axis, said vertical shaft being interconnected to said flap pushing member toward said first end, said vertical shaft having a lever arm attached thereto toward said opposite second end, said lever arm having a cam roller located at a distance from said shaft, said lever arm rotatable with said shaft, said roller being engagable with said second actuating apparatus, wherein movement of said article holder by said conveyor causes engagement of said cam roller with said second actuating apparatus, thereby causing said lever arm to rotate said shaft about said vertical axis to move said moving member relative to said base member from said first position to said second position.

19. A system as claimed in claim 15, wherein said receptacle is a carton.

20. A system as claimed in claim 16, wherein said second actuating apparatus comprises a cam rail mounted proximate to said conveyor, said cam rail being adapted to engage with said roller as each holder moves along a part of said conveyor path, said system operable to move said roller along, and in engagement with, said claim rail, to rotate said lever arm.

21. A system as claimed in claim 19 wherein the position of at least part of said cam rail relative to the path of said holder is adjustable.

22. A system as claimed in claim 18, wherein said second actuating apparatus comprises a cam rail mounted proximate to said conveyor, said cam rail being adapted to engage with said roller as each holder moves along a part of said conveyor path, said system operable to move said roller along, and in engagement with, said cam rail, to rotate said lever arm.

23. A system as claimed in claim 19 wherein the position of at least part of said cam rail is adjustable relative to the path of said holder.

24. A system as claimed in claim 20, wherein at least one of said first actuating apparatus and said second actuating apparatus is adjustable to adjust said second position to vary the maximum size of said outlet opening.

25. An article holder conveyor system having a station, said system comprising:
a conveyor having a conveyor path;
a plurality of article holders mounted to said conveyor in series, each article holder adapted to be moved along said conveyor path by said conveyor, each said article holder comprising:
a base member having an outlet side;
a connector assembly for connecting and mounting said article holder to said conveyor;
a first wall member mounted to said base;
a second wall member mounted opposite said first wall member on said base member and spaced apart from said first wall member and proximate said outlet side of said base member for movement relative to said base member, said first wall member and said second wall member defining therebetween an outlet at said outlet side of said base, said second wall member being pivotally rotatable between a first position and a second position;
said second wall member being interconnected to a first actuating apparatus associated with each article holder such that in operation of said system, movement of said first actuating apparatus pivotally rotates said second wall member between said first position and said second position relative to said base member;
said system operable to move each of said outlet, sides of each said article holder in turn into close proximity with a carton carried on a carton carrying conveyor at said station, and said system operable to said first actuating apparatus cause said first actuating apparatus to rotate said second wall member between said first position and second position to vary the size of said outlet between said first and second wall members.

26. A system as claimed in claim 25 further comprising a second actuating apparatus positioned proximate said conveyor, said second actuating apparatus co-operating with said first actuating apparatus of each article holder of said plurality of article holders, such that in operation as each article holder moves through said station, said second wall member of each article holder is moved between said first position and said second position by the interaction of each said first actuating apparatus of each article holder and said second actuating apparatus.

27. A system as claimed in claim 26, wherein said second actuating apparatus is configured to be adjustable to alter the interaction between the second actuating apparatus and the first actuating apparatus to adjust at least one of said first and second positions of said second wall member.

28. A system as claimed in claim 26 further comprising an adjustment assembly configured to adjust the second actuating apparatus whereby at least one of said first and second positions of said second wall can be changed.

29. A system as claimed in claim 27 wherein said base member has a substantially horizontal surface and said second wall member is mounted for pivoting rotation about a substantially vertical axis.

30. A system as claimed in claim 28 wherein each said first actuating apparatus comprises a vertical shaft having a top end and a bottom end, said shaft being aligned with, and rotatable about, said vertical axis, said vertical shaft being interconnected to said second wall member toward said top end of said vertical shaft, said vertical shaft having a lever arm attached thereto toward said opposite bottom end, said lever arm having a cam roller located at a distance from said shaft, said lever arm rotatable with said shaft; said roller being engagable with said second actuating apparatus, wherein movement of said article holder by said conveyor causes engagement of said cam roller with said second actuating apparatus, thereby causing said lever arm to rotate said shaft about said vertical axis to move said second wall member relative to said base member from said first position to said second position.

31. A system as claimed in claim 29, wherein said second actuating apparatus comprises a first cam rail mounted proximate to said conveyor, said first cam rail being adapted to engage with said roller as each holder moves along a part of said conveyor path, said system operable to move said roller along, and in engagement with, said first cam rail, to rotate said lever arm.

32. A system as claimed in claim 30 wherein the position of at least part of said cam rail relative to the path of said holder is adjustable.

33. A system as claimed in claim 31, wherein said second actuating apparatus is adjustable to adjust said second position to vary the maximum size of said outlet.

34. A system as claimed in claim 30 further comprising a second cam rail positioned in spaced apart relationship from said first cam rail to permit said roller to be received therebetween to substantially stabilize the path of the roller and prevent the roller becoming substantially disengaged from said first cam rail over a portion of the path of the roller.

35. An article holder as claimed in claim 14 wherein said second rotator is operatively interconnected to said first rotator, such that operation of said first rotator causes the operation of said second rotator.

36. A system as claimed in claim 25 wherein said first wall member is mounted for pivoting rotational movement relative to said second wall member and said base between a first position and a second position, and further comprising a second actuating apparatus associated with each article holder adapted to rotate said first wall member between said first and second positions, such that in operation said second actuating apparatus is operable to rotate said first wall member between said first and second positions and in an opposite rotational direction to said second wall member, such that when both said first and second side wall members are moved to said second positions, said spacing between said first and second side wall members at said outlet is increased.

* * * * *

UNITED STATES PATENT AND TRADEMARK OFFICE
CERTIFICATE OF CORRECTION

PATENT NO.   : 6,374,997 B1  Page 1 of 1
DATED        : April 23, 2002
INVENTOR(S)  : Tony Spadafora and Tomasz Kardynal It is certified that error appears in the above-identified patent and that said Letters Patent is hereby corrected as shown below:

<u>Column 18,</u>
Line 3, replace "claim" with -- cam --;

Signed and Sealed this

Fourteenth Day of January, 2003

JAMES E. ROGAN
*Director of the United States Patent and Trademark Office*